(12) United States Patent
Tanaka

(10) Patent No.: US 7,675,741 B2
(45) Date of Patent: Mar. 9, 2010

(54) ELECTRONIC COMPONENT MOUNTING PART AND ELECTRONIC APPARATUS

(75) Inventor: Kaigo Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/155,128

(22) Filed: May 29, 2008

(65) Prior Publication Data

US 2009/0040699 A1 Feb. 12, 2009

(30) Foreign Application Priority Data

Aug. 9, 2007 (JP) ............................. 2007-208564

(51) Int. Cl.
*G06F 1/16* (2006.01)
(52) U.S. Cl. .................. 361/679.02; 361/679.33
(58) Field of Classification Search ............ 361/679.02, 361/679.33
See application file for complete search history.

(56) References Cited

U.S. PATENT DOCUMENTS

| 5,124,887 | A | * | 6/1992 | Kobayashi | ............. 361/679.39 |
|---|---|---|---|---|---|
| 6,178,084 | B1 | * | 1/2001 | Shibasaki | .............. 361/679.33 |
| 6,373,693 | B1 | * | 4/2002 | Seto et al. | .............. 361/679.33 |
| 7,009,838 | B2 | | 3/2006 | Roh | |
| 7,164,577 | B2 | * | 1/2007 | Minaguchi et al. | ...... 361/679.33 |
| 7,423,868 | B2 | * | 9/2008 | Mihara et al. | .......... 361/679.33 |
| 7,457,110 | B2 | * | 11/2008 | Lo et al. | ................. 361/679.33 |
| 2006/0018087 | A1 | * | 1/2006 | Mizuno et al. | .............. 361/679 |
| 2007/0268661 | A1 | * | 11/2007 | Wobig et al. | ................. 361/685 |
| 2009/0040693 | A1 | * | 2/2009 | Tanaka | ....................... 361/679 |

FOREIGN PATENT DOCUMENTS

| JP | 05-102677 | 4/1993 |
|---|---|---|
| JP | 10-135661 | 5/1998 |
| JP | 2003-332765 | 11/2003 |
| KR | 10-2004-0050696 | 6/2004 |

* cited by examiner

*Primary Examiner*—Lisa Lea-Edmonds

(57) ABSTRACT

An HDD mounting part includes component fixing sections that respectively extend along both sides of an HDD and have widths not more than the height of the HDD. The HDD mounting part further includes: a first HDD fixing section that extends from the component fixing sections up to a position apart from a front end of the HDD and is fixed to a notebook PC at the position apart from the front end; and a second apparatus fixing section that extends from the component fixing sections up to a position apart from a rear end of the HDD and is fixed to the notebook PC at the position apart from the rear end.

11 Claims, 24 Drawing Sheets

ELECTRONIC COMPONENT MOUNTING PART AND ELECTRONIC APPARATUS

BACKGROUND OF THE INVENTION

1. Field of the Invention

The present invention relates to an electronic component mounting part for mounting an electronic component and an electronic apparatus provided with an electronic component mounted with the electronic component mounting part.

2. Description of the Related Art

An electronic apparatus is provided with various electronic components. Some of those electronic components are mounted via electronic component mounting parts. For example, a notebook type personal computer (hereinafter to be abbreviated as "notebook PC"), which is one of electronic apparatuses, is provided with a hard-disk drive unit as an electronic component. The hard-disk drive unit is substantially shaped like a rectangular solid when viewed from above and is mounted to the main unit of the notebook PC with a frame body, which is an electronic component mounting part made of metal in a squared U-shape so as to cover the upper and side surfaces of the hard-disk drive unit.

Conventionally, some of techniques related to an electronic component mounting part are known. For example, there is a frame body made of metal and having a flexible top panel. In this case, even when vibration or impact is externally applied to a notebook PC, the top panel absorbs the vibration or impact and prevents the vibration or impact from being applied to the hard-disk drive unit of the notebook PC.

In addition, for example, as an electronic component mounting part for mounting an electronic component, Japanese Patent Application Publication No. 5-102677 proposes a technique of mounting electronic components of difference sizes by providing, inside an electronic apparatus, two locking sections of a first locking section for locking electronic components with small dimensions and a second locking section for locking electronic components with large dimensions without employing any extra part.

Moreover, Japanese Patent Application Publication No. 2003-332765 proposes a technique for elaborating a structure for mounting a base plate serving as an electronic component in order to prevent the head of a screw for attaching the base plate from protruding through the surface of the base plate.

Further, Japanese Patent Application Publication No. 10-135661 proposes a technique for arranging a buffer member on the top and under surfaces of a floppy disk drive (FDD: registered trademark) unit serving as an electronic component. According to this technique, an L-shaped metal piece provided with a guide hole that allows the vertical movement of the FDD is arranged on the FDD-side surface and fixed within the enclosure of an electronic apparatus.

In recent years, because electronic apparatuses have become thinner, it has been an important issue to reduce the thickness of both an electronic component provided in an electronic apparatus and an electronic component mounting part for mounting the electronic component.

In the above-described technique that provides the top panel configuring the metal-made frame body with deflection to absorb vibration and impact to the hard-disk drive unit, there is such a problem that the thickness of the electronic apparatus cannot be reduced because the top panel is disposed on the top surface of the hard-disk drive unit.

In addition, the technique proposed in Japanese Patent Application Publication No. 5-102677, that provides the electronic apparatus in its inside with the first locking section for locking an electronic component with small dimensions and the second locking section for locking an electronic component with large dimensions, fails to mention a reduction in the thickness of those first and second locking sections serving as electronic component mounting parts as well as a reduction in the thickness of the electronic apparatus provided with the electronic components mounted by those electronic component mounting parts.

Moreover, Japanese Patent Application Publication No. 2003-332765 that proposes the technique for devising the base plate mounting structure also fails to mention a reduction in the thickness of the electronic component mounting parts and a reduction in the thickness of the electronic apparatus provided with the electronic components mounted by the electronic component mounting parts.

In addition, the technique proposed in Japanese Patent Application Publication No. 10-135661 has such a problem that because the buffer member is provided on the top and under surfaces of the FDD, the thickness of the electronic apparatus cannot be reduced.

SUMMARY OF THE INVENTION

The present invention has been made in view of the above circumstance and provides an electronic component mounting part that can absorb vibration and impact and contribute to reduction in the thickness of an electronic apparatus, and also provides an electronic apparatus that can absorb vibration and impact and is reduced in thickness.

An electronic component mounting part according to the present invention includes:

a pair of component fixing sections that respectively extend along both sides of an electronic component having a front end and a rear end in addition to the sides and are fixed to the electronic component, the component fixing sections having widths not more than height of the electronic component;

a first apparatus fixing section that extends from the component fixing sections up to a position apart from the front end of the electronic component and is fixed to an electronic apparatus at the position apart from the front end; and a second apparatus fixing section that extends from the component fixing sections up to a position apart from the rear end of the electronic component and is fixed to the electronic apparatus at the position apart from the rear end.

The electronic component mounting part of the present invention fixes an electronic component with the pair of component fixing sections extending along both sides of the electronic component and having widths not more than height of the electronic component. Therefore, it is possible to avoid an increase in the thickness of the electronic apparatus provided with the electronic component mounting part and thus to make the electronic apparatus thinner.

In addition, the electronic component mounting part of the present invention has the first and second apparatus fixing sections that extend from the part fixing sections up to the respective positions apart from the front end and the rear end of an electronic component. Therefore, a so-called deflection arm having a spring property is formed. Accordingly, it is possible to absorb vibration and impact by the deflection arm even in a case where vibration and impact are externally applied to the electronic component fixed by the electronic component mounting part of the present invention. In addition, even if an electronic component fixed by the electronic component mounting part of the present invention generates vibration, the deflection arm can also absorb that vibration.

In the electronic component mounting part according to the present invention, preferably, each of the component fixing sections includes a first portion extending along and apart from one of the sides of the electronic component and a second portion sagging from the first portion toward the side to be in contact with the side and fastened to the electronic component.

According to this additional feature, even in a case where the side surface of an electronic component is uneven and its tolerance is significant, the first portion can absorb these unevenness and tolerance and the second portion can securely fix the electronic component.

In the electronic component mounting part according to the present invention, preferably, the component fixing section includes: a side-along portion that extends along the side of the electronic component from the front end to the rear end of the electronic component; a front-end side bending portion that extends from the side-along portion and bends toward the front end of the electronic component to cover a part of the front end; and a rear-end side bending portion that extends from the side-along portion and bends toward the rear end of the electronic component to cover a part of the rear end, the side-along portion being formed of the first portion and the second portion.

This additional feature makes it possible to absorb vibration and impact and to protect the side as well as the front and rear ends of an electronic component.

Moreover, the electronic component mounting part of the present invention is preferably a metal sheet.

This additional feature makes it possible to realize a reduction in the thickness and weight of the electronic component mounting part and can improve the spring property.

In the electronic component mounting part according to the present invention, preferably, one of the first apparatus fixing section and the second apparatus fixing section is formed by a single portion extending from both of the pair of component fixing sections, the other is formed by two portions extending from the respective component fixing sections, and the electronic component mounting sections are formed integrally by molding.

This additional feature makes it possible to reduce the cost for manufacturing the electronic component mounting part.

Moreover, the electronic component mounting part of the present invention is preferably used to mount an electronic component including a mechanical driving section onto an electronic apparatus.

This additional feature makes it possible to reduce the influence of vibration and the like applied to the main unit of the electronic apparatus generated by the mechanical driving section of the electronic component.

In addition, the electronic component mounting part of the present invention is preferably used to mount an electronic component that accesses a storage medium with a mechanical driving section onto an electronic apparatus.

The present invention can be preferably applied to electronic components such as a hard-disk drive unit whose reduction in thickness is strongly demanded.

Moreover, the electronic component mounting part of the present invention is preferably used to mount an electronic component that generates vibration onto an electronic apparatus.

According to the present invention, transmission of vibration generated in electronic apparatus to the main unit of the electronic apparatus can be suppressed.

In addition, the electronic component mounting part of the present invention is preferably used to mount an electronic component in the shape of a substantially rectangular solid when viewed from above onto an electronic apparatus.

Accordingly, the electronic component mounting part of the present invention can be preferably applied to an electronic component, which is shaped like a substantially rectangular solid when viewed from above and whose reduction in thickness is strongly demanded.

In addition, the present invention also provides an electronic apparatus provided with the electronic component mounting part having any of the above-described various features and an electronic component mounted by the electronic component mounting part.

Since the electronic apparatus of the present invention is provided with the electronic component mounting part and the electronic component mounted with the electronic component mounting part, vibration as well as impact to the electronic component can be absorbed and the thickness of electronic apparatus can be reduced.

Here, the electronic apparatus of the present invention preferably further includes a data-processing unit provided with a built-in data-processing circuit that carries out data processing and a keyboard disposed on a top surface thereof to input an instruction according to an operation.

The present invention can be preferably applied to an electronic apparatus such as an input device provided with a data-processing unit including a keyboard on the top surface, whose reduction in thickness and size is strongly demanded.

In addition, the electronic apparatus of the present invention preferably further includes, in addition to the data-processing unit, a display unit that includes a display screen for displaying information and is linked to the data-processing unit in an openable and closable manner.

The present invention can be preferably applied to a notebook PC whose reduction in thickness and size is strongly demanded.

According to the present invention, it is possible to provide an electronic component mounting part that can absorb vibration and impact and contribute to reduction in the thickness of an electronic apparatus, and also possible to provide an electronic apparatus that can absorb vibration and impact and is reduced in thickness.

DETAILED DESCRIPTION OF THE INVENTION

An embodiment of the present invention will be described below. In the following description, a notebook PC will be employed as an example of the electronic apparatus according to the present invention.

[Entire Configuration]

Figure 1:
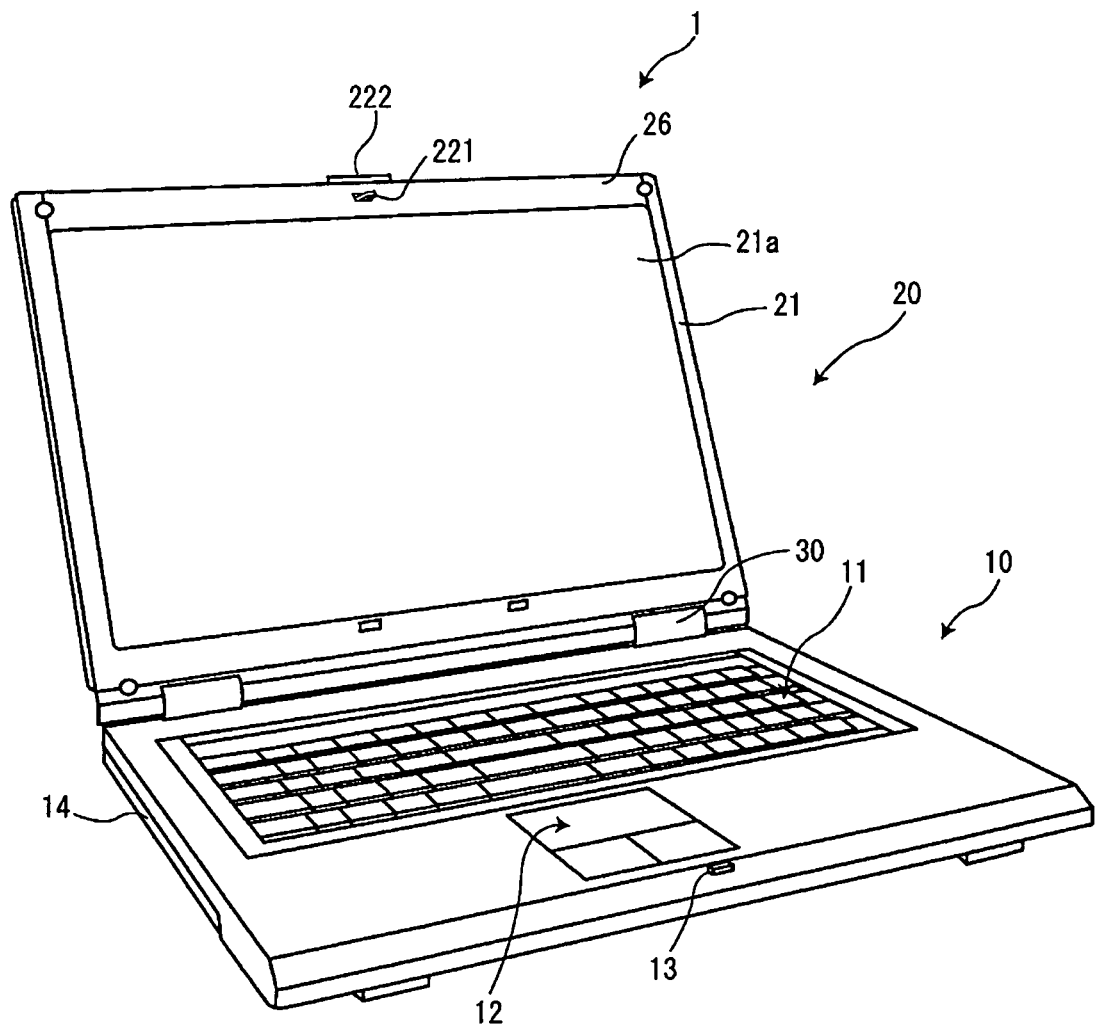
FIG. 1 is a perspective view of outer appearance of a notebook PC in an open state.
Figure 2:
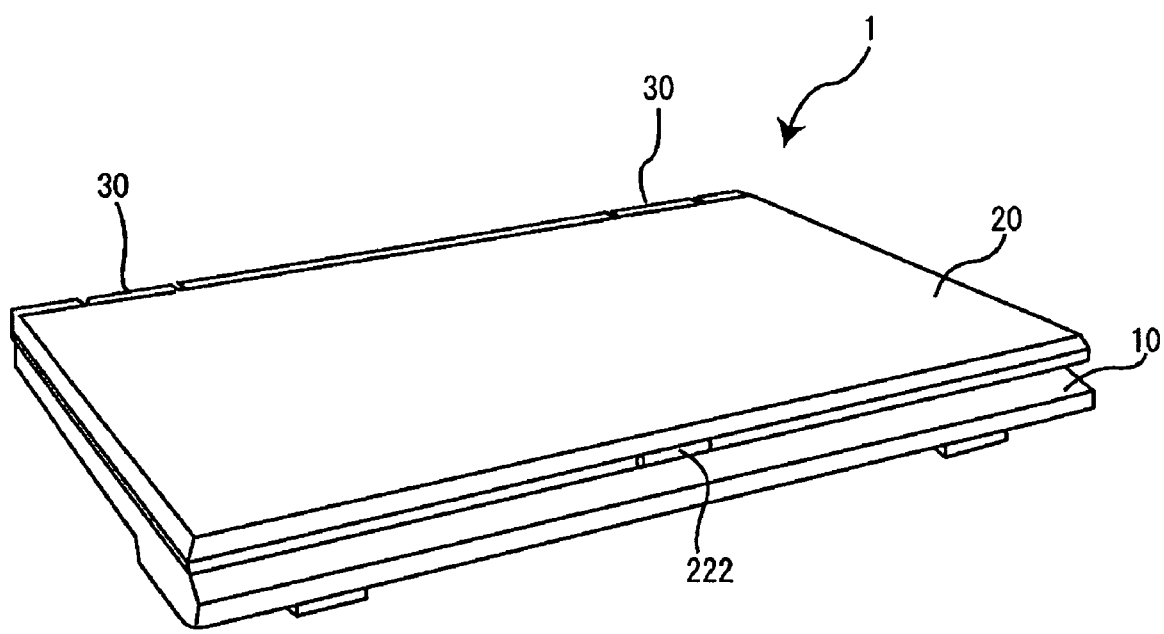
FIG. 2 is a perspective view of the notebook PC illustrated in FIG. 1 in a closed state.
Figure 3:
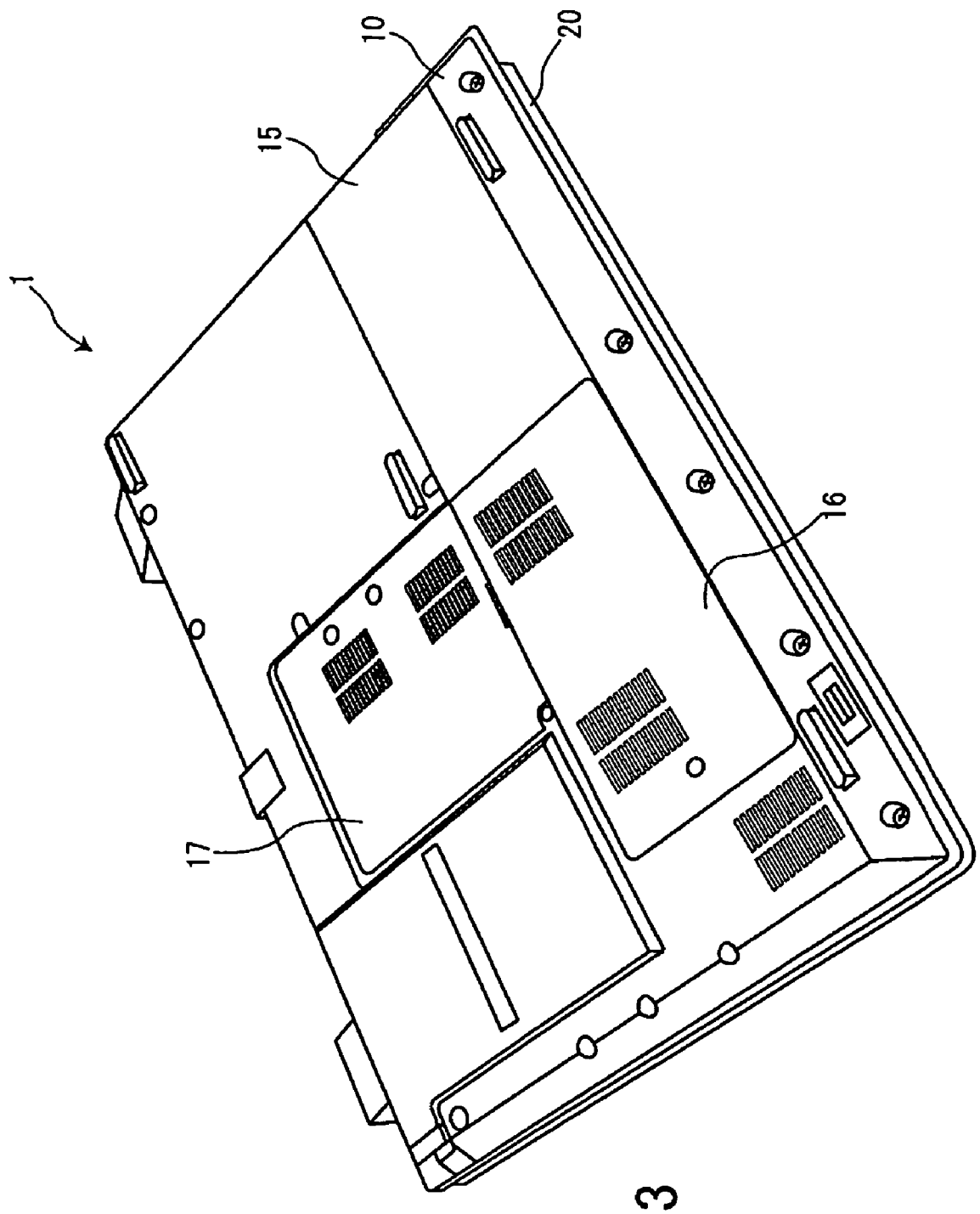
FIG. 3 is a perspective view of the under surface of the notebook PC illustrated in FIG. 1 in the closed state.

FIG. 1 is a perspective view of the outer appearance of a notebook PC 1 in an open state; FIG. 2 is a perspective view of the notebook PC 1 in a closed state; and FIG. 3 is a perspective view of the under surface of the notebook PC 1 in a closed state.

The notebook PC 1 is configured by a main unit 10 and a display unit 20. The display unit 20 is connected to the main unit 10 with a hinge member 30 and can be changed between a closed state (see FIG. 2) in which the display unit 20 lies on the main unit 10 and an open state (see FIG. 1) in which the display unit 20 is open with respect to the main unit 10.

Arranged on the top surface of the main unit 10 are: a keyboard 11 for inputting instructions according to operations; a track pad 12, one type of pointing devises, for specifying an arbitrary point on a display screen 21a (described later) according to operations; and an engagement hole 13 in which a hook 221 for locking is inserted.

In addition, the main unit 10 is provided with a CD/DVD drive unit 14 on its left flak as illustrated in FIG. 1 which drives a storage medium such as a CD or DVD when it is loaded with the storage medium.

Moreover, the main unit 10 is provided with a CPU and a large number of electronic components so as to carry out various kinds of operations by executing programs.

In addition, the main unit 10 is provided with a heat radiating unit (described later) for absorbing heat generated by the CPU and the like.

The display screen 21a, a part of a display panel 21, is arranged on the front surface of the display unit 20, and the periphery of the display screen 21a is covered by a front frame 26. In addition, the hook 221 for locking is provided on the front surface of the display unit 20. Specifically, the hook 221 is provided above the upper edge of the display screen 21a in such a manner that the hook 221 protrudes from the front frame 26. The hook 221 enters the engagement hole 13 formed on the top surface of the main unit 10 when the display unit 20 is closed to lie on the main unit 10. The hook 221 is locked inside the engagement hole 13 so that the display unit 20 cannot be accidentally opened.

Moreover, an unlocking operation member 222 is arranged on the top surface of the display unit 20. When the operation member 222 is pushed in the closed state as illustrated in FIG. 2, the hook 221 moves in the unlocking direction so that the hook 221 is disengaged from the engagement hole 13 and the display unit 20 can be opened.

In addition, as illustrated in FIG. 3, arranged on the under surface of the main unit 10 as components required for later description are: a battery 15 for supplying built-in electronic components of the main unit 10 with power; an HDD housing section cover 16 for covering the HDD housing section where a hard-disk drive unit (hereinafter referred to as HDD) is housed; and a memory-substrate housing section cover 17 for covering the memory substrate housing section where a memory substrate mounted with a memory is housed.

So far, the notebook PC in its entirety has been described schematically. Now, each section of the notebook PC will be described in detail.

[Structure of HDD Housing Section Cover]

Figure 4:
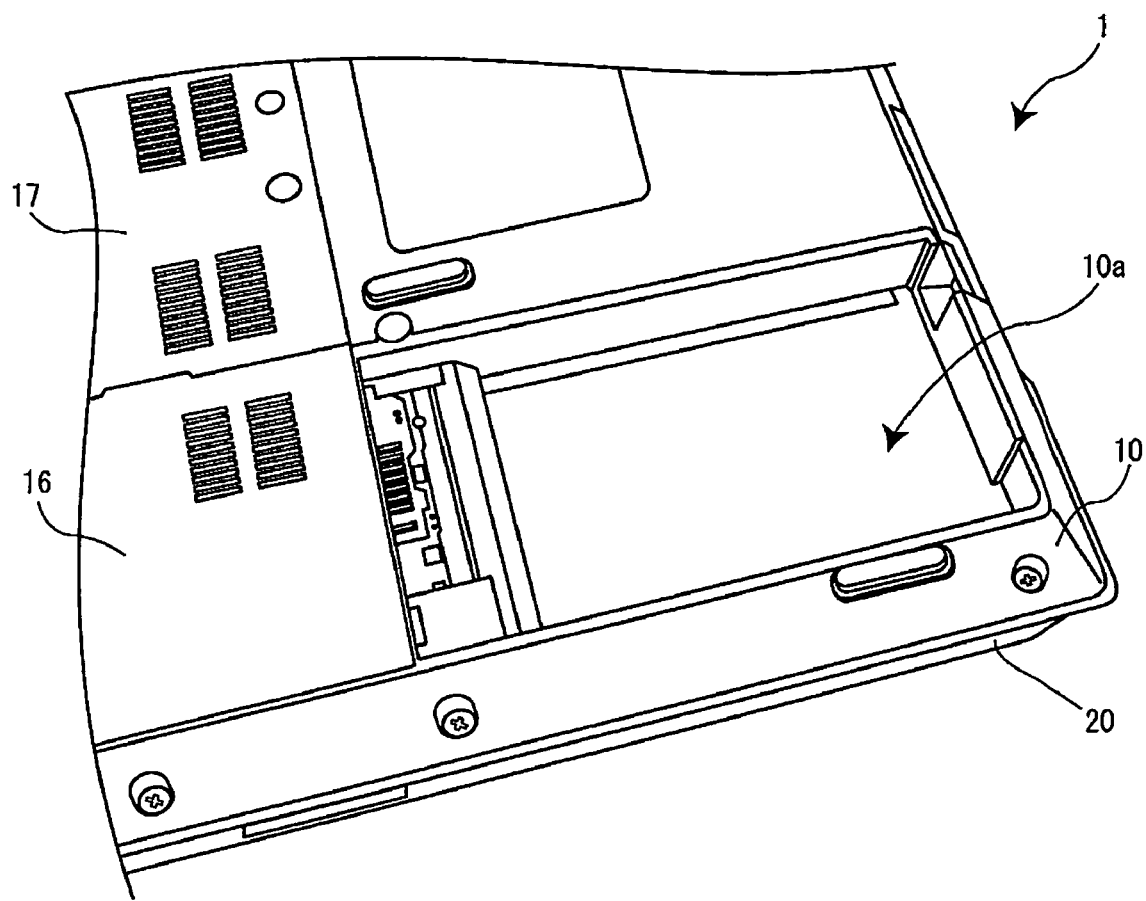
FIG. 4 is a diagram illustrating a part of the under surface of the main unit of a notebook PC with the battery being disengaged.
Figure 5:
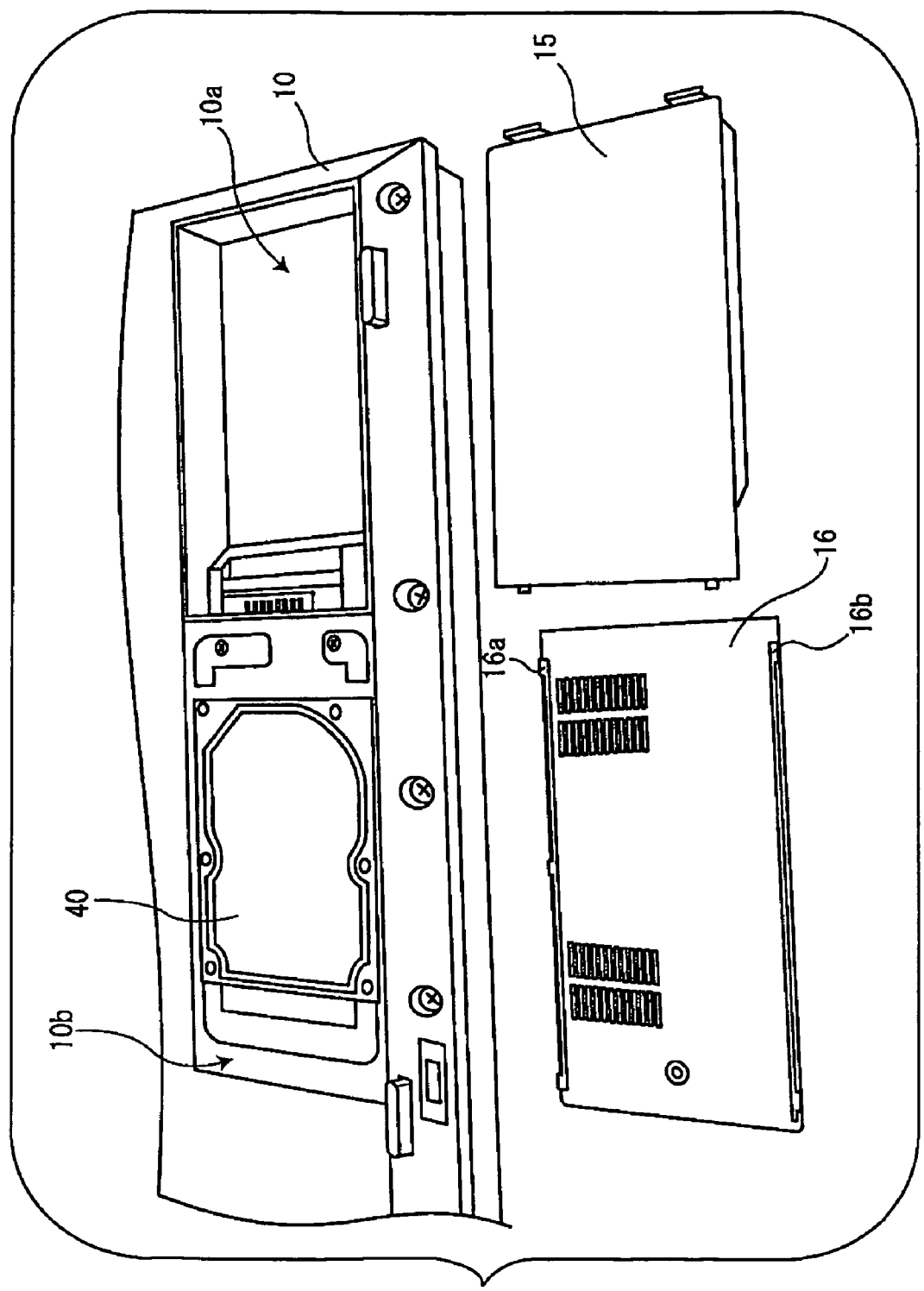
FIG. 5 is a diagram illustrating a part of the under surface of the main unit from which a battery and an HDD housing section cover are removed.

FIG. 4 is a diagram illustrating a part of the under surface of the main unit of the notebook PC from which the battery is removed, and FIG. 5 is a diagram illustrating a part of the under surface of the main unit from which the battery and the HDD housing section cover are removed.

As illustrated in FIG. 4, when the battery 15 is removed from the under surface of the main unit 10 of the notebook PC 1, there appears the battery housing section 10a provided in the enclosure of the main unit 10 to house the removable battery 15. In addition, as illustrated in FIG. 5, when the HDD housing section cover 16 is removed as will be described later from the under surface of the main unit 10 of the notebook PC 1 in the state where the battery 15 is removed, the HDD 40 housed in the HDD housing section lob provided in the enclosure of the main unit 10 appears. In addition, as illustrated in FIG. 5, the HDD housing section cover 16 has a claw section 16a and an engagement section 16b.

Figure 6:
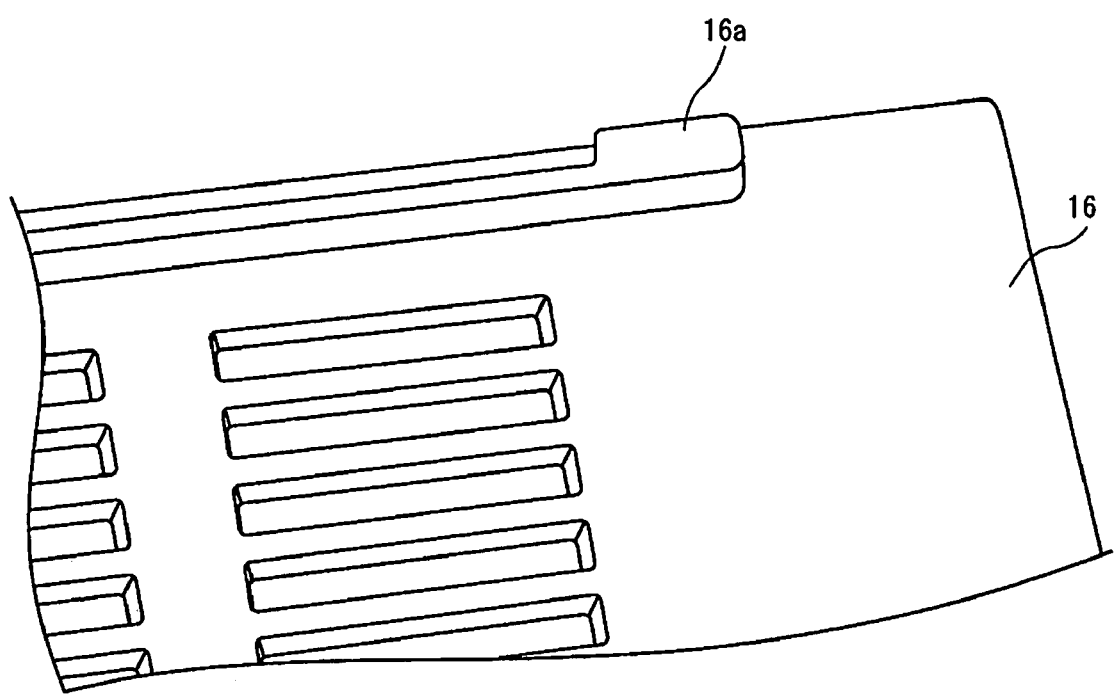
FIG. 6 is an enlarged view of a claw section of the HDD housing section cover.
Figure 7:
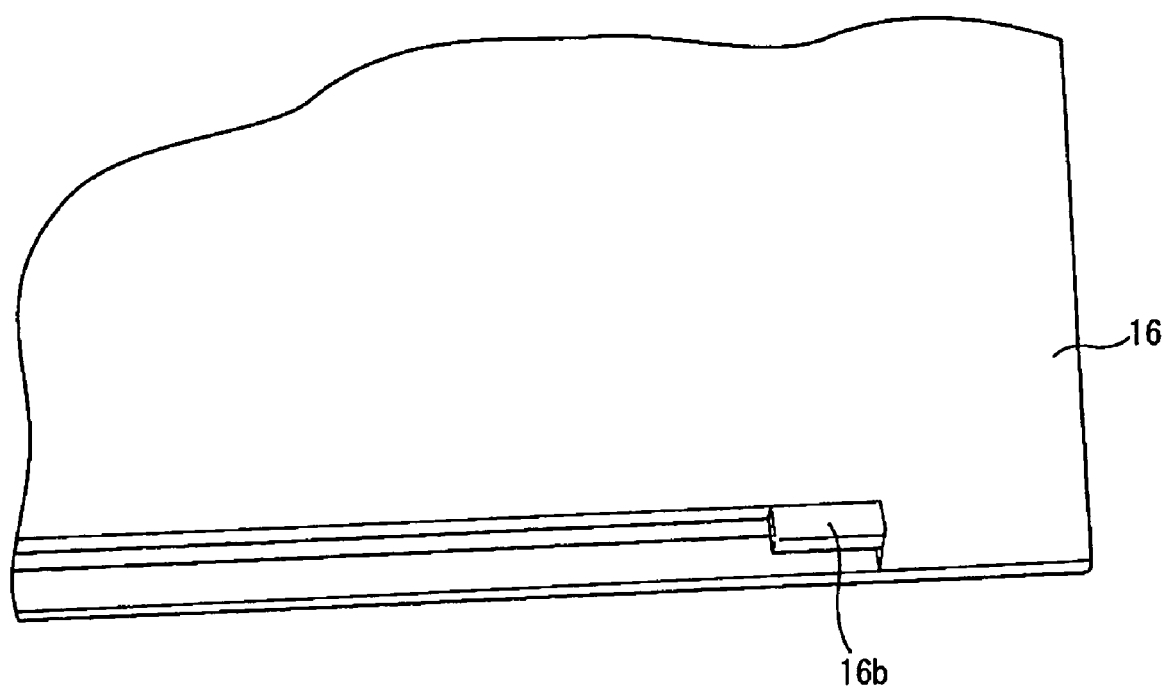
FIG. 7 is an enlarged view of an engagement section of the HDD housing section cover.

FIG. 6 is an enlarged view of the claw section 16a of the HDD housing section cover 16, and FIG. 7 is an enlarged view of the engagement section 16b of the HDD housing section cover 16.

The claw section 16a of the HDD housing section cover illustrated in FIG. 6 is to be engaged with an engagement section of the HDD housing section 10b. In addition, the engagement section 16b of the HDD housing section cover 16 illustrated in FIG. 7 is to be engaged with a claw section of the HDD housing section 10b. Specifically, the HDD housing section cover 16 covers the HDD 40 housed in the HDD housing section 10b and can move between the locked position where detachment is not allowed and the unlocked position where detachment is allowed thereby preventing a shift from the locked position to the unlocked position in the state where the battery 15 is housed in the battery housing section 10a. In other words, a shift from the locked position to the unlocked position is allowed only in the state where the battery 15 is removed from the battery housing section 10a. More specifically, in the state where the battery 15 is housed in the battery housing section 10a, the claw section 16a of the HDD housing section cover 16 is engaged with the engagement section of the HDD housing section 10b, and the engagement section 16b of the HDD housing section cover 16 is engaged with the claw section of the HDD housing section 10b and accordingly, the HDD housing section cover 16 is in the locked position where detachment is not allowed. Here, the battery 15 is removed from the battery housing section 10a and the HDD housing section cover 16 is moved to the right side in FIG. 5. Then, the claw section 16a of the HDD housing section cover 16 is disengaged from the engagement section of the HDD housing section 10b, and the engagement section 16b of the HDD housing section cover 16 is also disengaged from the claw section of the HDD housing section 10b, thereby allowing the HDD housing section cover 16 to move from the locked position to the unlocked position.

Here, in the case of a conventional notebook PC, an HDD housing section cover is removed to replace an HDD without removing the battery. In this case, at the time of maintenance and the like, it is very likely that a user/operator may remove the HDD without being aware that the power of the notebook PC is still turned on by mistake or due to failure and the like. In such a case, if the HDD is attached or detached, the HDD may be deteriorated or damaged by the power supplied from the battery. In the present embodiment, the following operational procedure is required to replace the HDD 40: first the battery 15 is removed and subsequently, the HDD housing section cover 16 is removed and finally, the HDD 40 is replaced. This procedure does not allow the HDD 40 to be taken out prior to removal of the battery 15, thereby preventing the HDD 40 from being deteriorated and damaged due to the power supplied from the battery 15.

In addition, as illustrated in FIG. 5, the battery insertion and removal surface of the battery housing section 10a and the attachment surface of the HDD housing section cover 16 are formed to be flush with a surface (under surface) of the notebook PC 1. Therefore, it is possible to improve workability when the HDD 40 is replaced at the time of maintenance and the like. Further, on the under surface side of the notebook PC 1, the portion (sliding margin) which allows the HDD housing section cover 16 to slide from the locked position where detachment is not allowed to the unlocked position where detachment is allowed, is covered by the battery 15. Therefore, outer appearance is improved. Moreover, the exposed surface of the battery 15 and the HDD housing section cover 16 form a part of the main unit 10 demarcating the outer shape of the notebook PC 1 and therefore, the amount of material to form the main unit 10 can be made small. Accordingly, the cost for manufacturing the notebook PC 1 can be reduced.

As described above, in the notebook PC 1, the HDD housing section cover 16 cannot be detached unless the battery 15 is in the state of being removed, and the sliding margin that allows the HDD housing section cover 16 to move is covered by the battery 15. Nevertheless, the memory-substrate housing section cover 17 (see FIG. 3) can be removed by being slid in the upper left direction in FIG. 3 even if the HDD housing section cover 16 is not in the state of being removed. In addition, the sliding margin that allows the memory-substrate housing section cover 17 to move is on the under surface of the notebook PC 1.

Now, with reference to FIG. 8 and FIG. 9, there will be described a modification in which the memory-substrate housing section cover 17 cannot be removed unless the HDD housing section cover 16 is removed and the sliding margin that allows the memory-substrate housing section cover 17 to move is covered by the battery 15.

Figure 8:
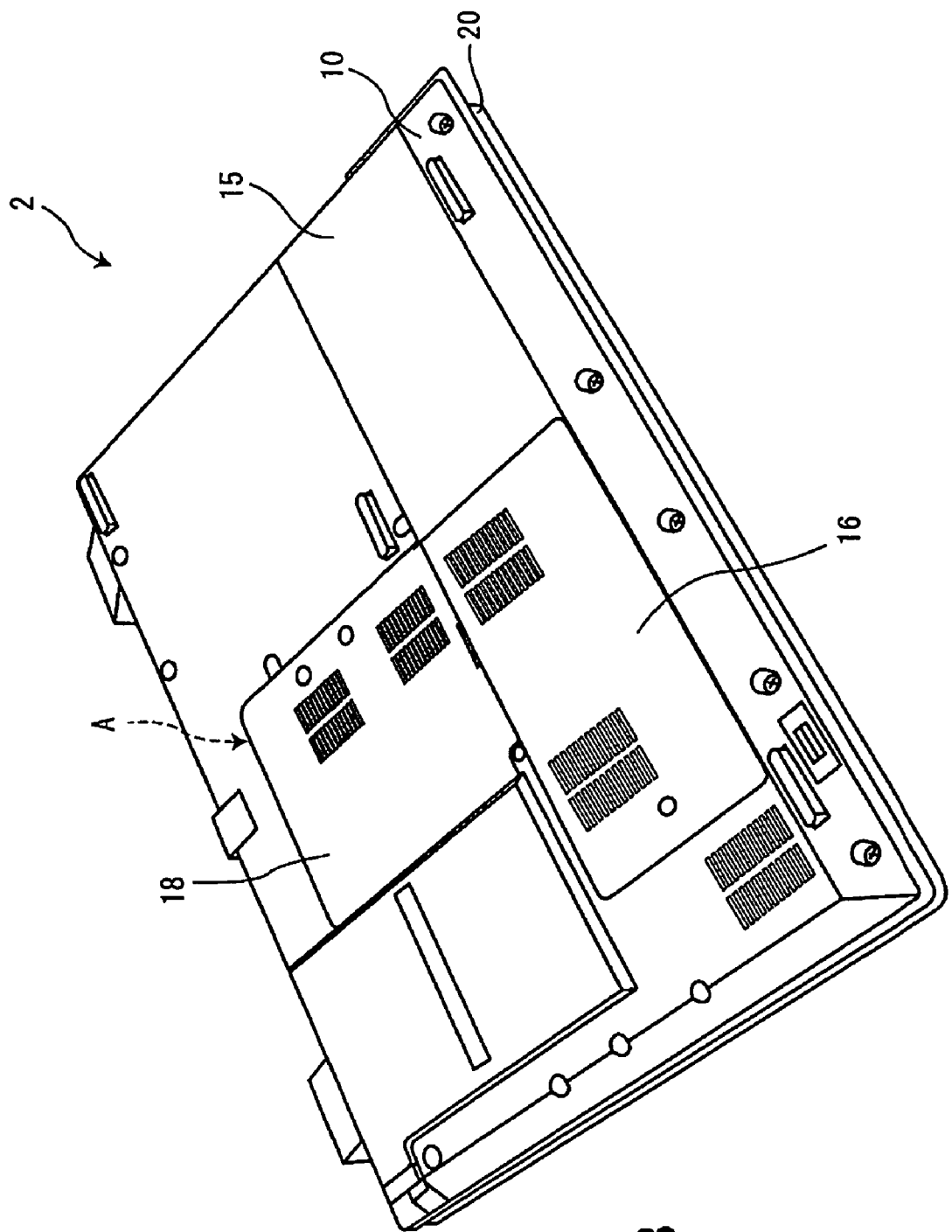
FIG. 8 is a perspective view of the under surface in the closed state of a notebook PC, which is different from the notebook PC illustrated in FIG. 3.
Figure 9:
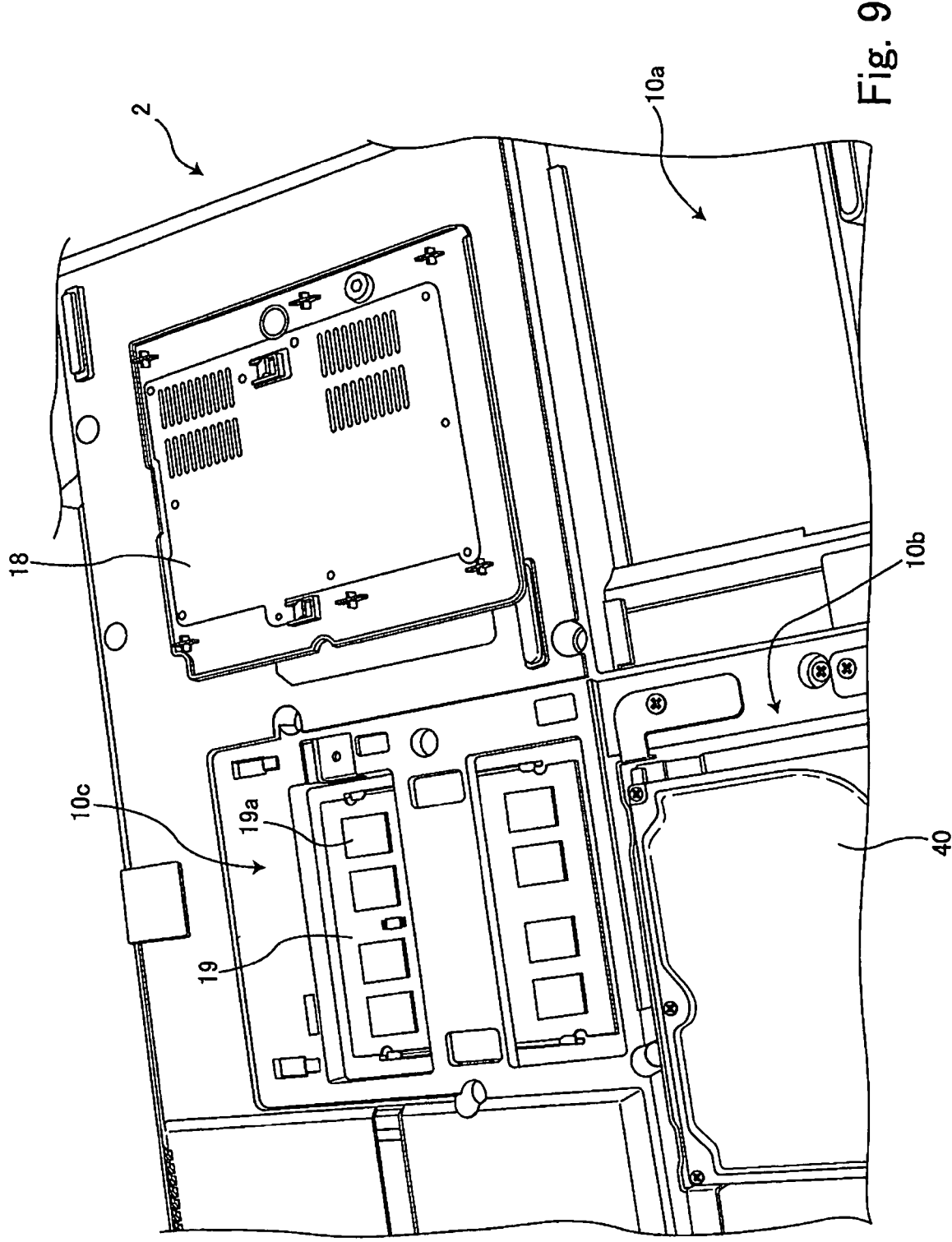
FIG. 9 is a diagram illustrating the under surface of the main unit of the notebook PC illustrated in FIG. 8 from which a battery, an HDD housing section cover and a memory-substrate housing section cover are removed.

FIG. 8 is a perspective view of the under surface of a notebook PC in the closed state, which is different from the notebook PC illustrated in FIG. 3, and FIG. 9 is a diagram illustrating the under surface of the main unit of the notebook PC illustrated in FIG. 8 with the battery, the HDD housing section cover and the memory-substrate housing section cover being removed.

Incidentally, the same components of the modification as those shown in FIG. 3 are assigned the same reference characters as those shown in FIG. 3 and only the points different from FIG. 3 will be described.

A notebook PC 2 illustrated in FIG. 8 is provided with a memory-substrate housing section cover 18. This memory-substrate housing section cover 18 covers a memory substrate 19 in which a memory 19a illustrated in FIG. 9 is packaged and which is removably housed in the memory substrate housing section 10c. In addition, movement of the memory-substrate housing section cover 18 from a locked position to an unlocked position is not allowed in the state where the HDD housing section cover 16 is mounted, whereas movement from the locked position to the unlocked position is allowed in the state where the HDD housing section cover 16 is removed. Therefore, in order to replace the memory substrate 19 at the time of maintenance and the like, the following operational procedure is required: first the battery 15 is removed and then, the HDD housing section cover 16 is removed and finally, the memory-substrate housing section cover 18 is removed to replace the memory substrate 19. Accordingly, it is possible to prevent deterioration of and damage to electronic components such as the memory 19a packaged in the memory substrate 19 due to power supplied from the battery 15. In addition, as illustrated in FIG. 8, a portion A (sliding margin) on the under surface of the notebook PC 1 that allows the memory-substrate housing section cover 18 to move from the locked position where removal is not allowed to the unlocked position where removal is allowed is covered by the memory-substrate housing section cover 18 and therefore, outer appearance is improved.

This concludes the description of the modification with reference to FIG. 8 and FIG. 9. Now the description of the notebook PC 1 shown in Figures except for FIG. 8 and FIG. 9 will be resumed and continued.

[HDD Mounting Part]

Figure 10:
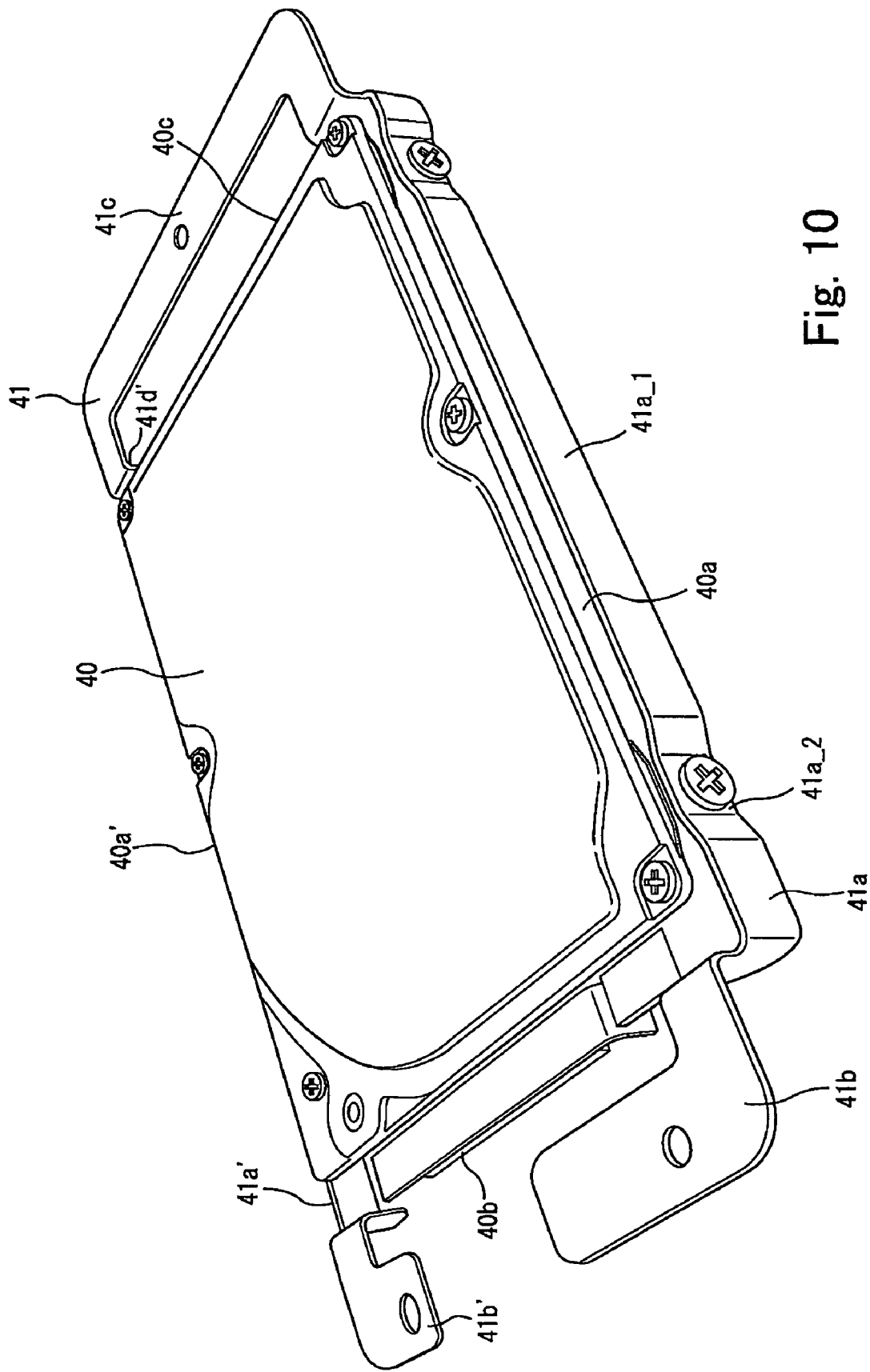
FIG. 10 is a perspective view of an HDD to which an HDD mounting part is attached as viewed from above.
Figure 11:
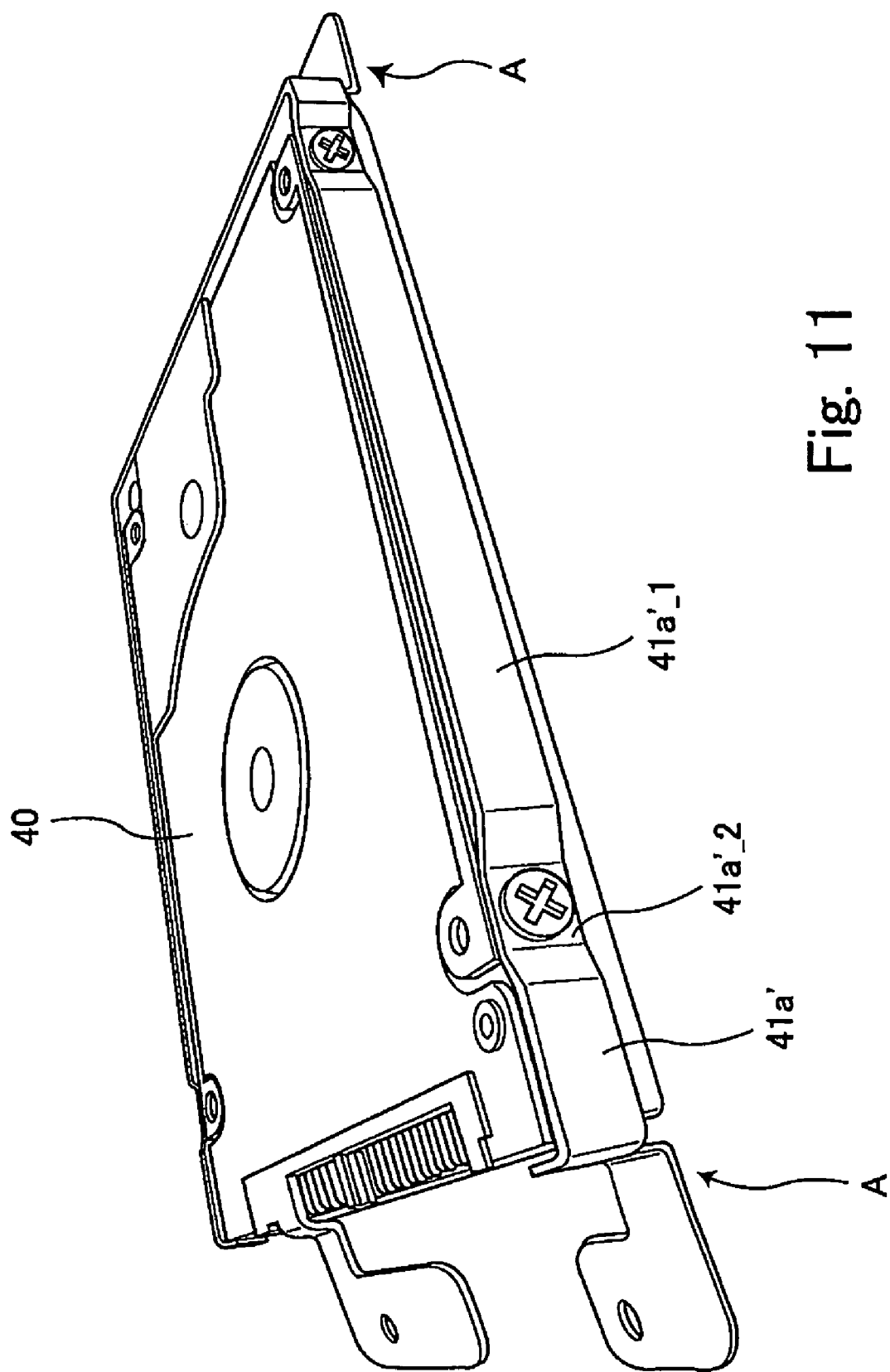
FIG. 11 is a perspective view of the HDD to which the HDD mounting part is attached as viewed from below.

FIG. 10 is a perspective view of the HDD to which an HDD mounting part is attached as viewed from above. FIG. 11 is a perspective view of the HDD to which the HDD mounting part is attached as viewed from below.

As illustrated in FIG. 10 and FIG. 11, an HDD mounting part 41 is attached to an HDD 40. The HDD 40 has both sides 40a and 40a' and a front end 40b and a rear end 40c as illustrated in FIG. 10. The HDD mounting part 41 is formed integrally with a metal sheet by molding. Accordingly, the cost for manufacturing the HDD mounting part 41 can be reduced thereby realizing reduction in thickness and weight. In addition, it is also realized that the HDD mounting part 41 is provided with spring property.

The HDD mounting part 41 has a pair of component fixing sections 41a and 41a' extending along both sides 40a and 40a', being fixed to the HDD 40 and having width of not more than the height of the HDD 40.

In addition, the HDD mounting part 41 has first HDD fixing sections 41b and 41b' that extend from the pair of component fixing sections 41a and 41a' up to positions apart from the front end 40b of the HDD 40 and fixed to the main unit 10 of the notebook PC 1.

Moreover, the HDD mounting part 41 has a second HDD fixing section 41c that extends from the pair of component fixing sections 41a and 41a' up to a position apart from the rear end 40c of the HDD 40 and fixed to the main unit 10.

The HDD mounting part 41 extends along both of the sides 40a and 40a' of the HDD 40 and fixes the HDD 40 with the pair of component fixing sections 41a and 41a' having width of not more than the height of the HDD 40. Therefore, the HDD mounting part 41 prevents an increase in the thickness of the notebook PC 1. Accordingly, as compared with a conventional technique for disposing the top panel on the top surface of an HDD, the HDD mounting part 41 contributes to a reduction in the thickness of the notebook PC 1.

In addition, the HDD mounting part 41 has, as described above, the first and second HDD fixing sections 41b, 41b' and 41c that extend from the pair of component fixing sections 41a and 41a' up to the respective positions apart from the front end 40b and the rear end 40c of the HDD 40. Therefore, as illustrated in FIG. 11, a deflection arm A provided with so-called spring property is formed. Accordingly, even in the case where vibration and impact are externally applied to the HDD 40 fixed by the HDD mounting part 41, those vibration and impact can be absorbed by the deflection arm A. On the contrary, even if the HDD 40 fixed by the HDD mounting part 41 generates vibration, that vibration can be absorbed by the deflection arm A as well.

Moreover, the pair of component fixing sections 41a and 41a' also have: first portions 41a_1 and 41a'_1 extending along but apart from the sides 40a and 40a' of the HDD 40; and second portions 41a_2 and 41a'_2 sagging from the first portions 41a_1 and 41a'_1 toward the sides 40a and 40a' to be in contact with the sides 40a and 40a' and fixed to the HDD 40. Therefore, even in the case where the sides 40a and 40a' of the HDD 40 are uneven and tolerance thereof is large, those unevenness and tolerance are absorbed at the first portions 41a_1 and 41a'_1 and the HDD 40 is securely fixed at the second portions 41a_2 and 41a'_2.

In other words, the pair of component fixing sections 41a and 41a' respectively have side-along portions (a portion formed by the first portions 41a_1, 41a'_1 and the second portions 41a_2, 41a'_2) that extend from the front end 40b to the rear end 40c of the HDD 40 along the sides 40a and 40a' of the HDD 40. The pair of component fixing sections 41a and 41a' also respectively have front-end side bending portions (first HDD fixing sections 41b and 41b') that extend from the side-along portions and bend toward the front end 40b to cover a part of the front end 40b. The pair of component fixing sections 41a and 41a' also have a rear-end side bending portion (second HDD fixing section 41c) that extend from the side-along portions and bends toward the rear end 40c of the HDD 40 to cover a part of that rear end 40c.

The second HDD fixing section 41c is a single portion that extends from both of the pair of component fixing sections 41a and 41a', and the first HDD fixing sections 41b and 41b' are portions that extend from the pair of component fixing sections 41a and 41a', respectively.

[Contact Structure of Hinge Member and Panel Attaching Member]

Figure 12:
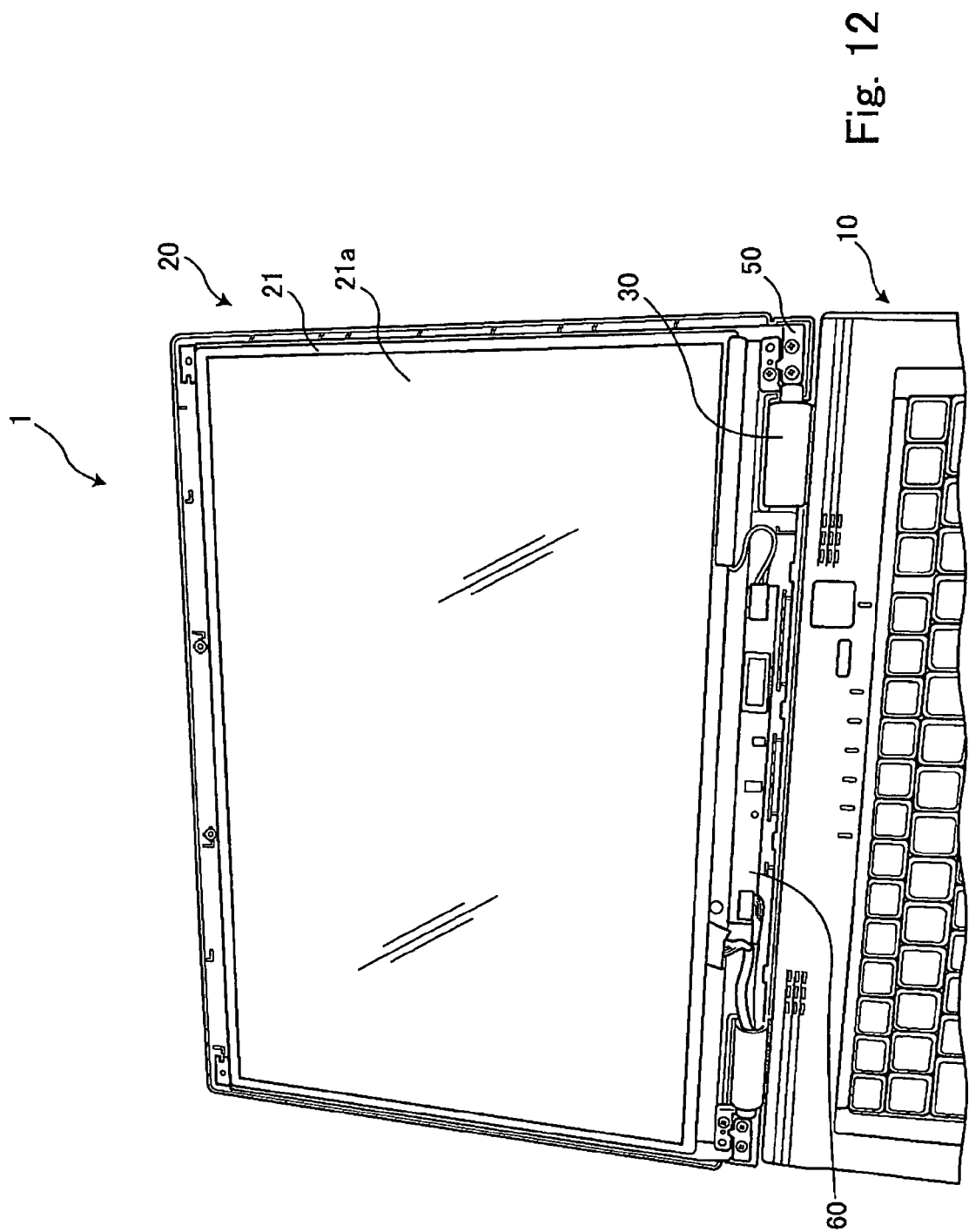
FIG. 12 is a diagram illustrating the notebook PC from which a front frame of a display unit is removed.

FIG. 12 is a diagram illustrating the notebook PC 1 with the front frame of the display unit 20 being removed.

FIG. 12 illustrates the display unit 20 provided with the display panel 21 including the display screen 21a for displaying information in the state where the front surface of that display screen 21a is exposed. In addition, the hinge member 30 bridging the display unit 20 and the main unit 10 in an openable and closable manner is illustrated. Moreover, a panel attaching member 50 which intervenes for fastening the display panel 21 to the display unit 20 is illustrated. In addition, in FIG. 12, a circuit substrate 60 for lighting the display panel 21 (described later) is also illustrated.

Figure 13:
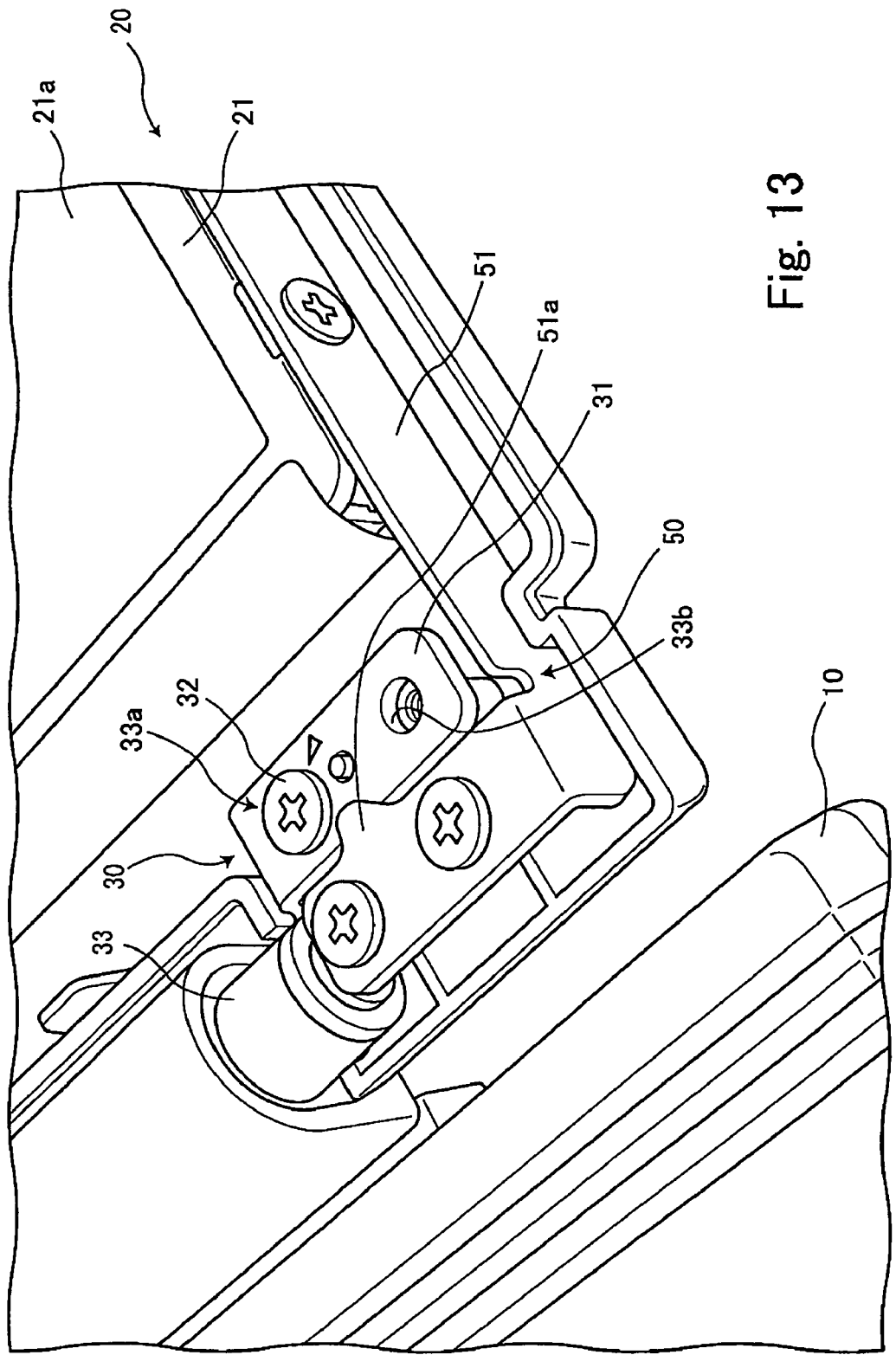
FIG. 13 is an enlarged perspective view of a hinge member as well as a panel attaching member illustrated in FIG. 12.

FIG. 13 is a perspective enlarged view of the hinge member 30 as well as a panel attaching member 50 illustrated in FIG. 12.

FIG. 13 illustrates a hinge fastening section 31 of the hinge member 30. The hinge fastening section 31 is fastened to the display unit 20. In addition, FIG. 13 illustrates a panel fastening section 51 of the panel attaching member 50. The panel fastening section 51 extends along and is fastened to the side of the display panel 21.

Specifically, the panel fastening section 51 of the panel attaching member 50 extends toward the main unit 10 to be arranged adjacent to the hinge fastening section 31, and fastened to the display unit 20 independently of the hinge fastening section 31. In addition, the panel fastening section 51 partially has a tongue piece 51a that extends toward and contacts the hinge fastening section while overlaying the hinge fastening section 31 from the front surface side of the display screen.

In the notebook PC 1, the hinge member 30, which links the display unit 20 to the main unit 10 in an openable and closable manner, is fastened to the display unit 20 with the hinge fastening section 31 of the hinge member 30, and the panel attaching member 50, which has the panel fastening section 51 fixed to the side of the display panel 21a, is fastened to the display unit 20 independently of the hinge fastening section 31. In other words, the hinge fastening section 31 of the hinge member 30 and the panel fastening section 51 of the panel attaching member 50 are attached to the display unit 20 separately. In addition, the panel fastening section 51 has the tongue piece 51a. As illustrated in FIG. 13, the tongue piece 51a is small in shape and thickness to merely touch the hinge fastening section 31. Therefore, dimension in the direction of thickness of the display unit 20 is made small and accordingly contributes to reduction in thickness of the notebook PC 1. In addition, in order to replace the display panel 21, there is no need to remove the hinge fastening section 31 of the hinge member 30, but only the panel fastening section 51 of the panel attaching member 50 needs to be removed.

Figure 14:
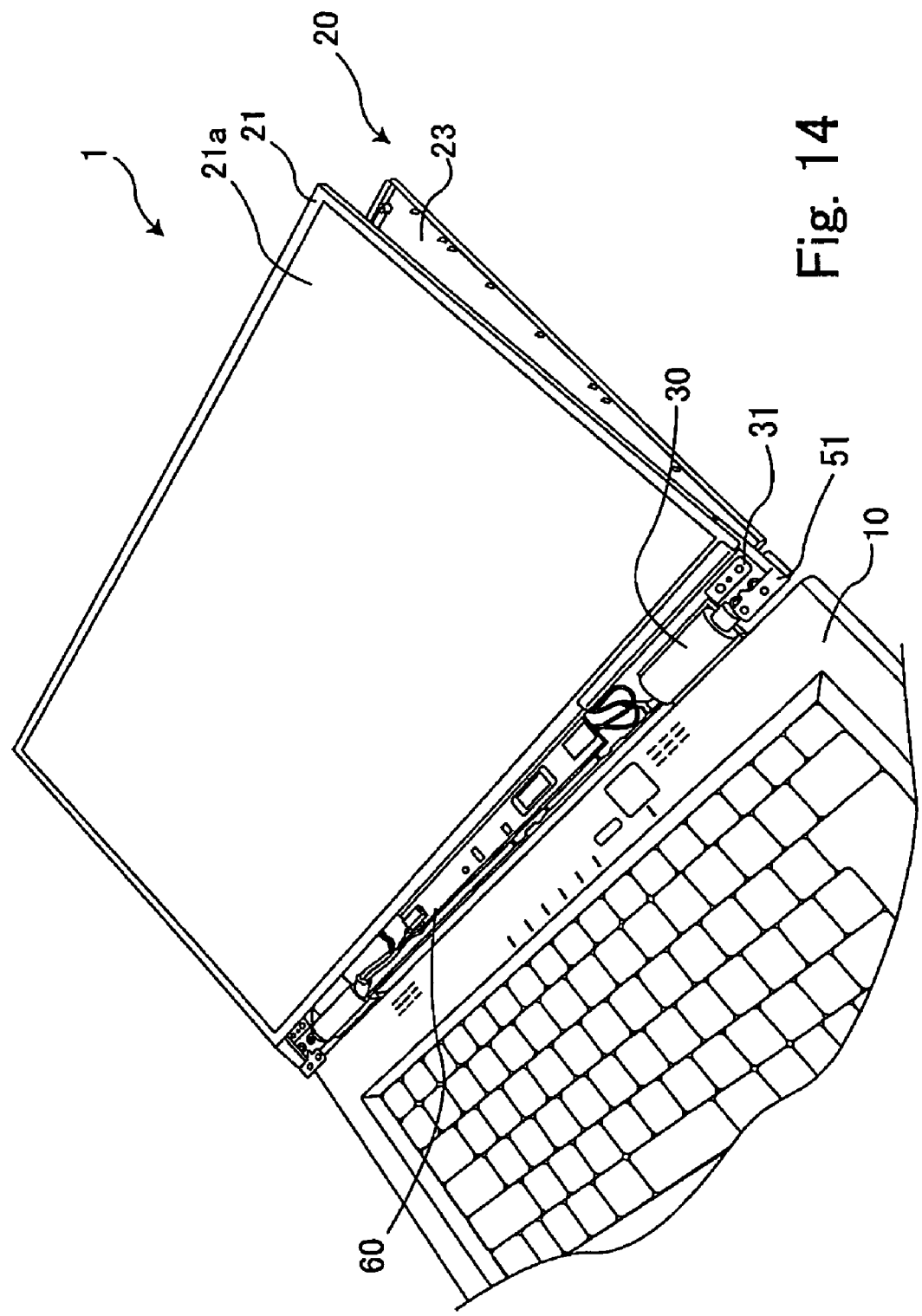
FIG. 14 is a diagram illustrating how a display panel is removed from the display unit.

FIG. 14 is a diagram illustrating how the display panel 21 is removed from the display unit 10.

In order to remove the display panel 21 from the display unit 20, as illustrated in FIG. 14, there is no need to remove the hinge fastening section 31 of the hinge member 30, but only the panel fastening section 51 of the panel attaching member 50 needs to be removed. Accordingly, when replacing the display panel 21, there is no need to adjust the hinge member 30 to reach an attachment state and the display panel 21 can be replaced easily.

In addition, the hinge fastening section 31 of the hinge member 30 and the panel fastening section 51 of the panel attaching member 50 are both made of metal that is an electrically conductive material and electrically conduct with the tongue piece 51a. Therefore, conduction of the main unit 10 and the display unit 20 to the ground can be secured through the contact by the tongue piece 51a. Accordingly, there is no need to additionally provide a ground for the main unit 10 and the display unit 20 by using an electrically conductive member such as gasket and metal spring, for the purpose of preventing electromagnetic noise and electrostatic noise, thereby reducing the cost. Incidentally, there may be a case where conduction of the main unit 10 and the display unit 20 to the ground is not basically required as countermeasures against electromagnetic noise and electrostatic noise. In such a case, the tongue piece 51a can be easily removed so that conduction of the main unit 10 and the display unit 20 to the ground can be readily cut off.

In addition, the display unit 20 has an area larger than the circumference of the display panel 21 and has a back plate 23 that houses the display panel 21 (see FIG. 14) and the front frame 26 that covers the periphery of the display panel 21 from the front surface side of the display screen 21a (see FIG. 1). Moreover, as illustrated in FIG. 13, the hinge fastening section 31 has: a first hole 33a for screwing the back plate 23 and the hinge fastening section 31 with a screw 32 except the front frame 26; and a second hole 33b for screwing the hinge fastening section 31, the back plate 23 and the front frame 26 in the state where the hinge fastening section 31 is sandwiched between the back plate 23 and the front frame 26. Therefore, when the notebook PC 1 is assembled, the back plate 23 and the hinge fastening section 31 are temporarily fastened by means of the first hole 33a with a screw and then, the front frame 26, the hinge fastening section 31 and the back plate 23 can be completely fastened by means of the second hole 33b with a screw in the state where the hinge fastening section 31 is sandwiched between the back plate 23 and the front frame 26. Accordingly, the notebook PC 1 can be easily assembled.

Moreover, as illustrated in FIG. 13, the panel fastening section 51 goes around the hinge fastening section 31 and is positioned closer to the main unit 10 than the hinge fastening section 31 is. Therefore, the display unit 20 is provided with a sufficiently large display panel 21.

[Cross Structure of Hinge Member and Panel Attaching Member]

As described with reference to FIG. 12, FIG. 13 and FIG. 14, the panel attaching member 50 attached to the display panel 21 has the panel fastening section 51 that extends along the side surface of the display panel 21 toward the main unit 10 and goes around the hinge fastening section 31 fastened to the display unit 20, so that the panel fastening section 51 is positioned at the main unit 10 side of the hinge fastening section 31 and fastened to the display unit 20. That is, the panel fastening section 51 extends along the side surface of the display unit 20 until it reaches the lower part of the display unit 20. In this structure, when the display unit 20 is opened and closed with respect to the main unit 10, a large load applied to the lower section of the display unit 20 is received by the panel fastening section 51. Accordingly, while reduction in thickness of the notebook PC 1 is realized, strength in the lower section of the display unit 20 is enhanced so as to prevent the lower section of the display unit 20 from being damaged.

In addition, as illustrated in FIG. 13, the hinge member 30 has a shaft section 33 having a rotary shaft. In addition, the hinge fastening section 31 is attached to an end of the rotary shaft of the shaft section 33 and is fastened to the display unit 20 at such a position that the hinge fastening section 31 is farther away from the main unit 10 than the shaft section 33 is. Therefore, the panel fastening section 51 used for fastening the display panel 21 is fastened to the display unit 20 at a position closer to the main unit 10 while avoiding interference with the hinge fastening section 31.

In addition, as illustrated in FIG. 13, the panel fastening section 51 goes around toward the main unit 10 side of the hinge fastening section 31 and is fastened to the display unit 20 at a position up to which the shaft section 33 extends in the direction of the rotary shaft. Therefore, the extended portion of the shaft section 33 of the hinge member 30 is made stronger so that the display unit 20 can be smoothly opened and closed.

Moreover, the hinge fastening section 31 and the panel fastening section 51 are fastened to the display unit 20 independently of each other. Therefore, as described above, to replace the display panel 21, only the panel fastening section 51 has to be removed. Therefore, the display panel 21 can be easily replaced.

In addition, the panel fastening section 51 is provided with the tongue piece 51a that extends toward the hinge fastening section 31 to touch the hinge fastening section 31 that overlays the hinge fastening section 31 from above (i.e. from the front surface side of the display screen 21a). Here, the hinge fastening section 31 and the panel fastening section 51 are both made of metal and brought into electrical contact with the tongue piece 51a. Accordingly, there is no need to additionally provide a ground for the main unit 10 and the display unit 20 by using an electrically conductive member such as gasket and metal spring, for the purpose of preventing electromagnetic noise and electrostatic noise, thereby reducing the cost. Incidentally, there may be a case where conduction of the main unit 10 and the display unit 20 to the ground is not basically required as countermeasures against electromagnetic noise and electrostatic noise. In such a case, the tongue piece 51a can be easily removed so that conduction of the main unit 10 and the display unit 20 to the ground can be readily cut off.

Moreover, the display unit 20 has an area larger than the display panel 21, and has the back plate 23 that houses the display panel 21 and the front frame 26 that covers the periphery of that display panel 21 from the front surface side of the display screen 21a. In addition, the hinge fastening section 31 has: the first hole 33a for screwing the back plate 23 and the panel fastening section 31 except the front frame 26 with a screw 32; and the second hole 33b for screwing the panel fastening section 31, the back plate 23 and the front frame 26, in the state where the panel fastening part 31 is interposed between the back plate 23 and the front frame 26. Therefore, for assembling the notebook PC 1, the back plate 23 and the hinge fastening section 31 are temporarily fastened by means of the first hole 33a with the screw 32 and then, the front frame 26, the hinge fastening section 31 and the back plate 23 can be completely fastened by means of the second hole 33b with a screw in the state where the hinge fastening section 31 is interposed between the back plate 23 and the front frame 26 with the second hole 33b. Accordingly, the notebook PC 1 can be assembled easily.

[Fixing Structure of Display Panel Lighting Circuit Substrate]

For assembling the notebook PC 1 illustrated in FIG. 1, a display panel that matches the model and function of the notebook PC 1 is selected and the display unit 20 is provided with the selected display panel. Specifically, the display unit 20 is provided with one display panel selected from a first display panel having one light source that emits light for backlighting and a second display panel having two light sources that emit light for backlighting. Therefore, there are prepared a first circuit substrate with a relatively small area to be selected when the first display panel is selected and a second circuit substrate with a relatively large area to be selected when the second display panel is selected.

Figure 15:
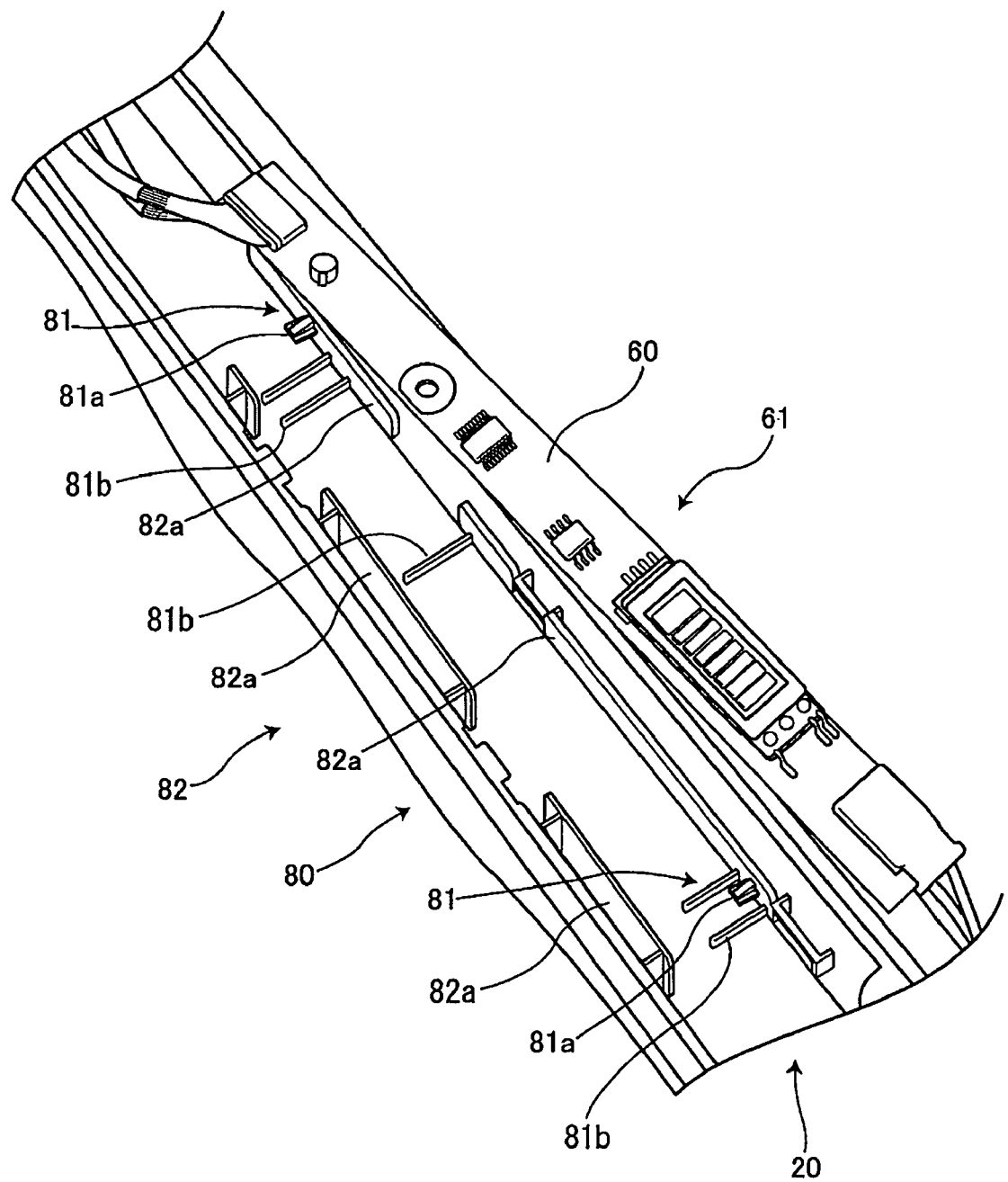
FIG. 15 is a diagram illustrating the first circuit substrate with a relatively small area, which is removed from the display unit.

FIG. 15 is a diagram illustrating a first circuit substrate 60 with a relatively small area being removed from the display unit.

Here, the display panel 21 is equivalent to the first display panel provided with one light source emitting light for backlighting. FIG. 15 illustrates a first circuit substrate 60 with a relatively small area for lighting the display panel 21. A lighting control circuit 61 composed of electronic components to control lighting of the one light source is mounted onto the first circuit substrate 60.

Figure 16:
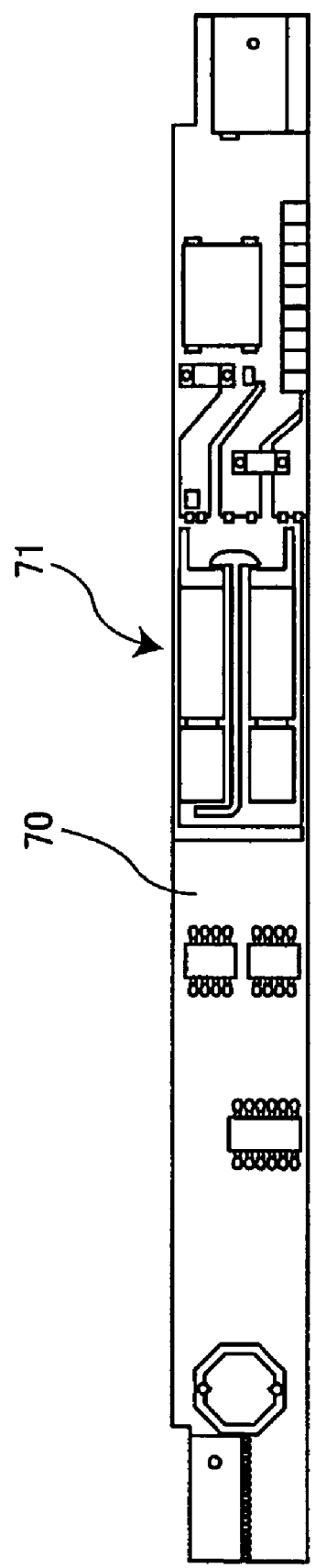
FIG. 16 is a diagram illustrating a second circuit substrate for lighting the display panel, which is provided with two light sources emitting backlight.

FIG. 16 is a diagram illustrating a second circuit substrate 70 for lighting the display panel provided with two light sources that emit light for backlighting.

A lighting control circuit 71 composed of electronic components to control lighting of the two light sources is mounted onto the second circuit substrate 70 illustrated in FIG. 16. That is, since electronic components for two lights are mounted on the second circuit substrate 70, dimensions including width and length of the second circuit substrate 70 are larger than the first circuit substrate 60. Incidentally, in both of the first circuit substrate 60 and the second circuit substrate 70, the height of the components mounted on the front surface of the substrate is higher than that of the components mounted on the rear side of the substrate. In addition, on the rear side of the substrate, only wiring may be formed and the components may not be mounted.

Now, referring back to FIG. 15, description will be continued. The display unit 20 illustrated in FIG. 15 is provided with a first supporting structure 81 supporting the first circuit substrate 60 and a substrate supporting section 80 having a second supporting structure 82 supporting the second circuit substrate 70.

The first supporting structure 81 has a supporting claw 81a supporting the first circuit substrate 60 in the state where the front surface of the first circuit substrate 60 is directed upward. In addition, the first supporting structure 81 has a receiving section 81b receiving the rear surface of the first circuit substrate 60.

On the other hand, the second supporting structure 82 has a stand 82a on which the second circuit substrate 70 is mounted in the state where the front surface of the second circuit substrate 70 is directed downward.

Figure 17:
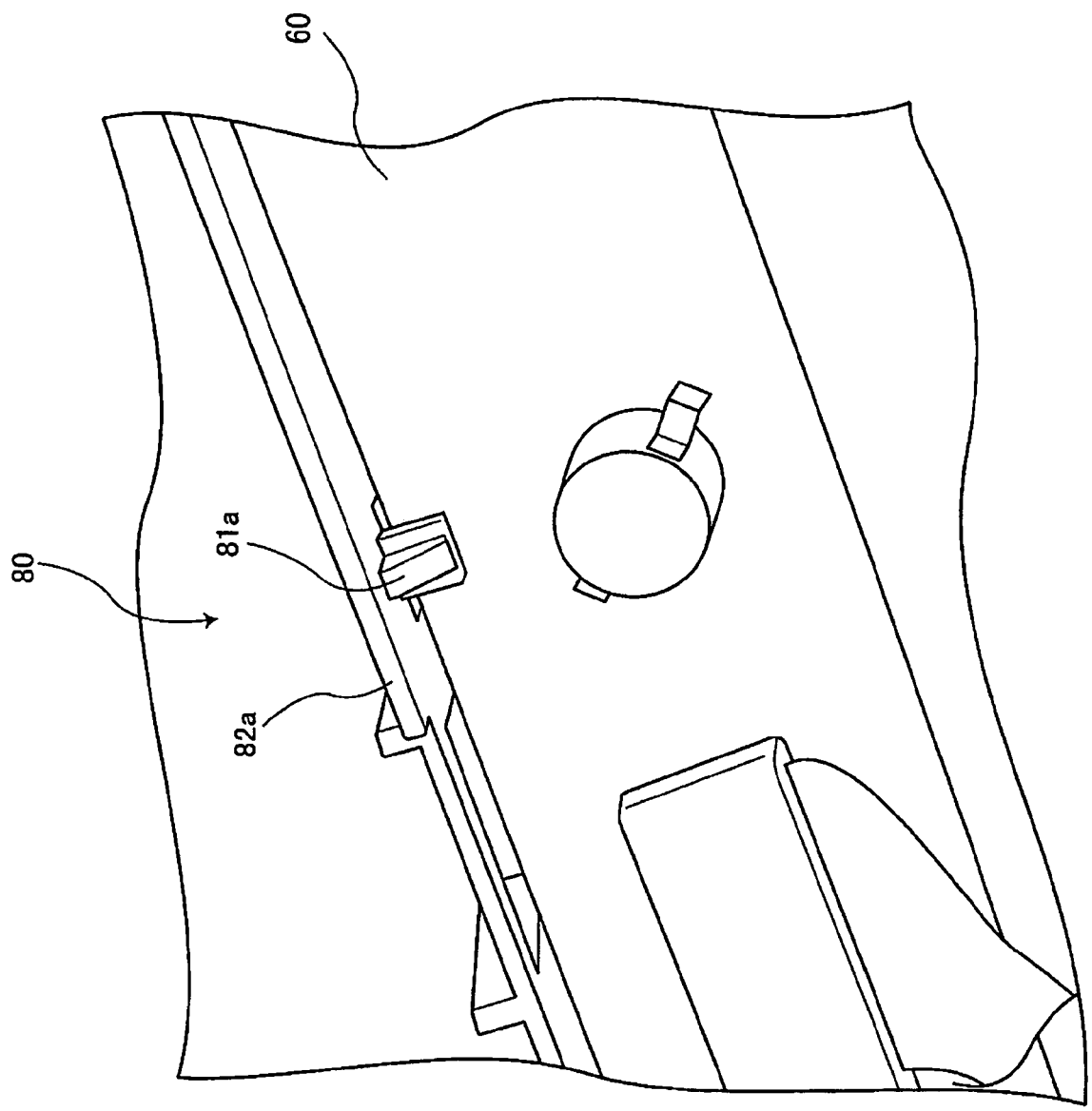
FIG. 17 is an enlarged view of a part of the first supporting structure and a part of the first circuit substrate supported by the first supporting structure.

FIG. 17 is an enlarged view of a part of the first supporting structure and a part of the first circuit substrate supported by the first supporting structure.

The first circuit substrate 60 illustrated in FIG. 17 is supported by the supporting claw 81a of the first supporting structure 81 in the state where the front surface of the first circuit substrate 60 is directed upward. On the other hand, the second circuit substrate 70 is put on the stand 82a of the second supporting structure 82 in the state where the front surface of the second circuit substrate 70 is directed downward.

Thus, the substrate supporting section 80 has the first supporting structure 81 supporting the first circuit substrate 60 with a relatively small area and the second supporting structure 82 supporting the second circuit substrate 70 with a relatively large area. Therefore, whichever the first circuit substrate 60 or the second circuit substrate 70 is selected, the selected circuit substrate can be supported by the circuit supporting section 80 which is a single member. Accordingly, the space of the display unit 20 can be made smaller as compared with the case where the display unit 20 having the display panel 21 built therein is provided with both of the substrate supporting section for supporting the first circuit substrate 60 and the substrate supporting section for supporting the second circuit substrate 70 separately.

In addition, in the case where the first circuit substrate 60 is selected, the front surface of the first circuit substrate 60 is directed upward and the first circuit substrate 60 is supported by the nail 81a of the first supporting structure 81. In the case where the second circuit substrate 70 is selected, the front surface of the second circuit substrate 70 is directed downward and the second circuit substrate 70 is supported by the stand 82a of the second supporting structure 82. By adopting such a structure, the upper and lower space of the substrate supporting section 80 is utilized effectively so that any circuit substrate selected from the first and second circuit substrates 60 and 70 can be supported.

In addition, the display unit 20 has the back plate 23 with an area larger than the display panel for housing the display panel and the front frame 26 covering the periphery of the display panel from the front surface side of the display screen. The substrate supporting section 80 is provided at such a position of the back plate 23 that the substrate supporting section 80 avoids overlapping the display panel. Such a structure contributes to reduction in thickness as compared with a case where the substrate supporting section 80 is disposed at such a position that the substrate supporting section 80 overlaps the display panel. In addition, the circuit substrate supported by the substrate supporting section 80 and the display panel are connected to each other with comparatively short wiring.

[Structure of Frame Body and Button of CD/DVD Drive Unit]

Figure 18:
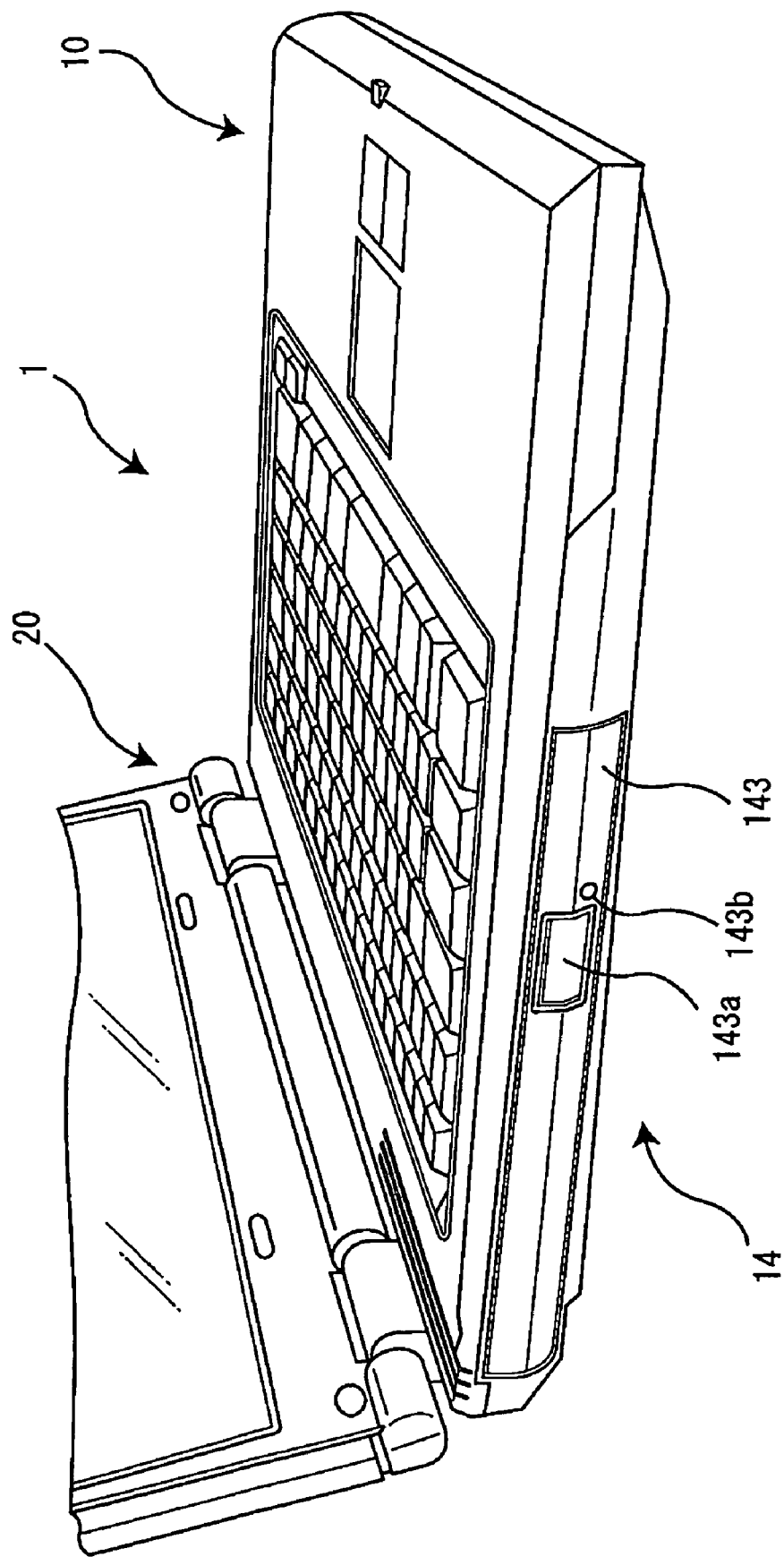
FIG. 18 is a perspective view of the notebook PC as viewed from the left side in an open state.
Figure 19:
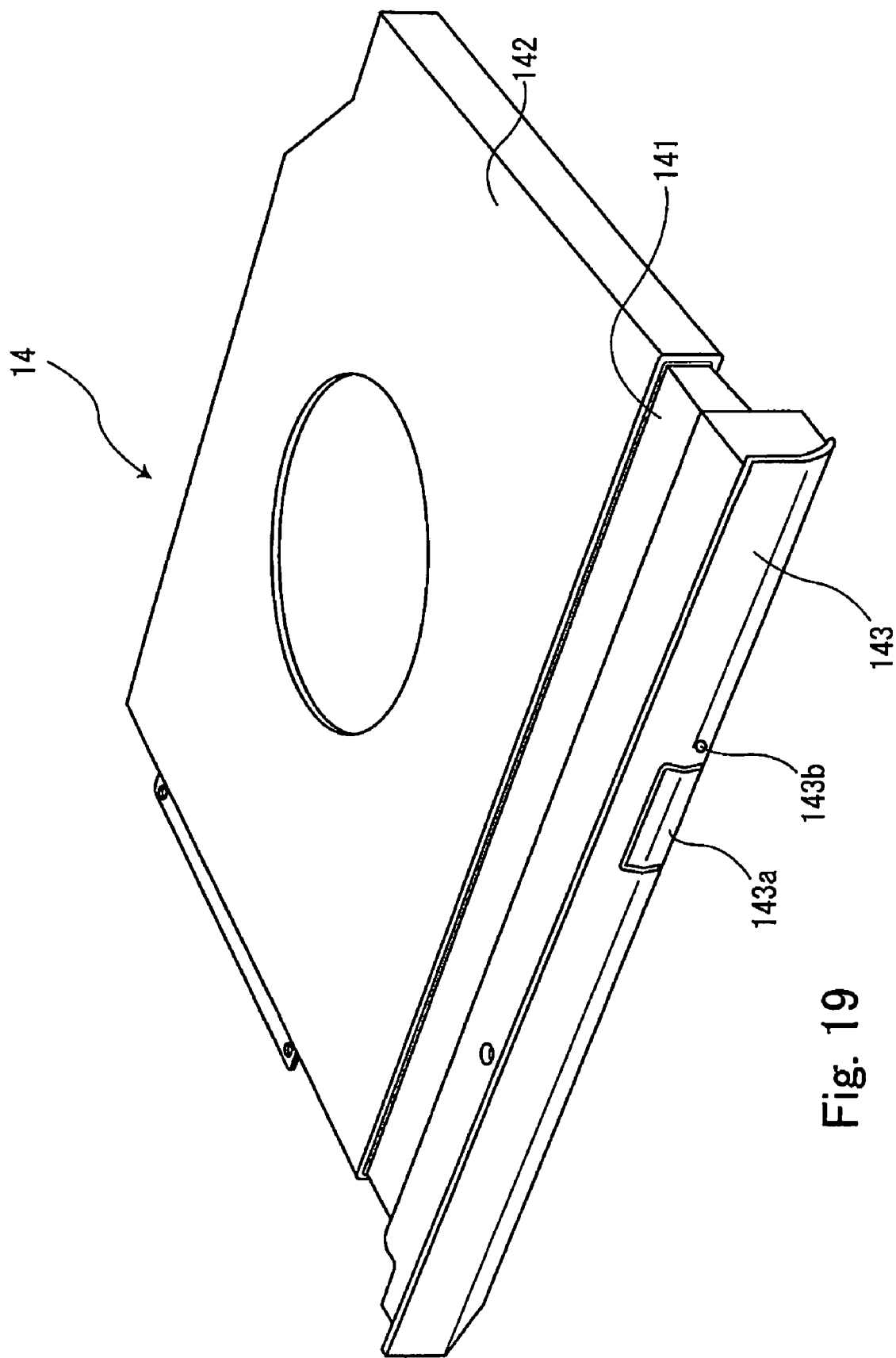
FIG. 19 is a perspective diagram of a CD/DVD drive unit removed from the main unit of the notebook PC.

FIG. 18 is a perspective view of the notebook PC 1 as viewed from the left side in an open state. FIG. 19 is a perspective view of a CD/DVD drive unit 14 removed from the main unit 10 of the notebook PC 1.

The main unit 10 illustrated in FIG. 18 is provided, on its left side, with the CD/DVD drive unit 14 in which a storage medium such as CD and DVD is loaded and which drives the loaded storage medium.

The CD/DVD drive unit 14 is provided with a tray 141, in which a removable storage medium is loaded and which drives the loaded storage medium, and a housing body 142 that houses the tray 141 illustrated in FIG. 19 in a slidable manner. In addition, the CD/DVD drive unit 14 is provided with a frame body 143 that covers the front-end surface of the housing body 142 where the tray 141 slides out from the housing body 142. The frame body 143 forms a part of the main unit 10 of the notebook PC 1 when the CD/DVD drive unit 14 is mounted onto the notebook PC 1. The frame body 143 has a flexible portion 143a that will be described later. In addition, the frame body 143 has an opening 143b for causing the tray 141 to slide out from the housing body 142 with a tool at the time of maintenance. Description will be continued with reference to FIG. 20 and FIG. 21.

Figure 20:
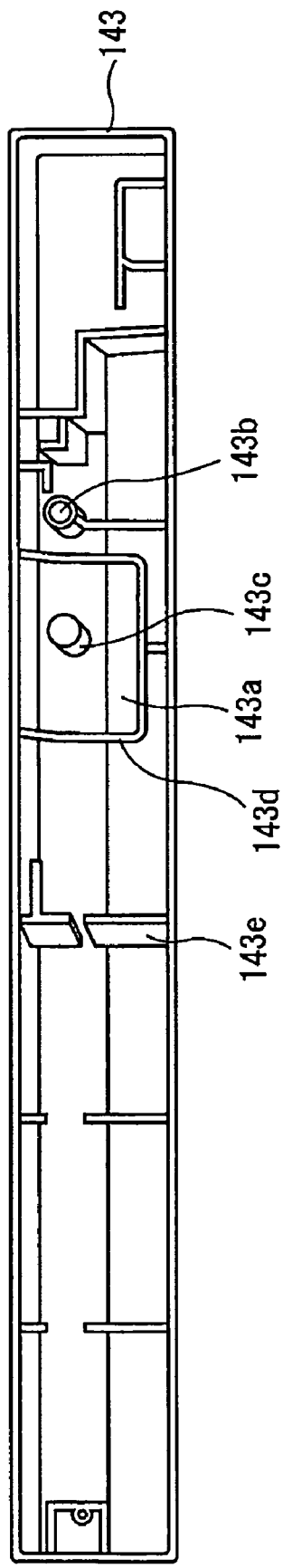
FIG. 20 is a diagram illustrating the rear surface of the frame body removed from a tray.
Figure 21:
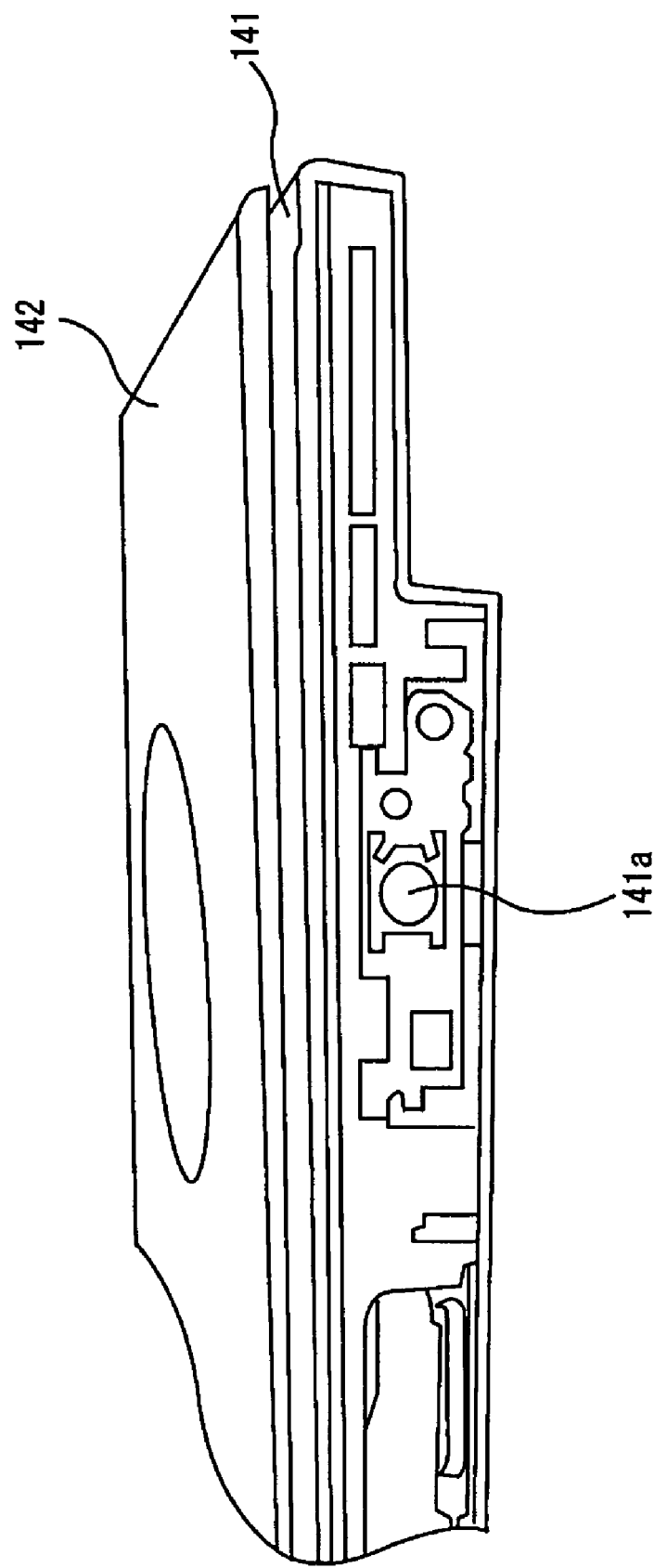
FIG. 21 is a diagram illustrating the front-end surface of the tray with the frame body being removed.

FIG. 20 is a diagram illustrating the rear surface of the frame body 143 removed from the tray 141. FIG. 21 is a diagram illustrating the front-end surface of the tray 141 with the frame body 143 being removed.

The front surface of the tray 141 illustrated in FIG. 21 is provided with a button 141a that causes the tray 141 to slide out from the housing body 142 when pressed. In addition, the flexible portion 143a of the frame body 143 has, as illustrated in FIG. 20, a protrusion 143c that protrudes toward the tray 141 on the rear surface of the frame body 143 facing the tray 141 and is positioned adjacent to the button 141a. When externally pressed, the flexible portion 143a deflects toward the tray 141 so that the tip of the protrusion 143c pushes the button 141a. As a result, the tray 141 slides out from the housing body 142. Here, the frame body 143 is provided with the flexible portion 143a that deflects toward the tray 141 and the protrusion 143c that pushes the button 141a, and the frame body 143 is integrally formed by molding, thereby reducing the cost. In addition, the button 141a provided in the tray 141 is depressed by the tip of the protrusion 143c provided in the rear surface of the frame body 143. Such a structure makes it possible to arrange the tray 141 at a position sufficiently deeper than the frame body 143. Accordingly, even if the frame body 143 deflects toward the tray 141, the tray 141 is hardly visible through a gap formed due to the deflection, which prevents impairment of the outer appearance.

More specifically, as illustrated in FIG. 20, the frame body 143 has a slit 143d which extends along a contour line of the frame body 143 while surrounding the protrusion 143c to define the flexible portion 143a except a partial area of the contour line. The slit 143d is formed through the frame body 143 to appear on the front and rear surfaces of the frame body 143. In addition, the flexible portion 143a is designed to, upon being pressed, deflect thereby elastically bending at the partial region. Therefore, the flexible portion 143a of the frame body 143 is formed in a simply manner.

In addition, the frame body 143 has a rib 143e that stands on its rear surface facing the tray 141 and abuts the front-end surface of the tray 141. Therefore, weight as well as material cost of the frame body 143 is reduced while high strength of the frame body 143 is maintained.

Moreover, the frame body 143 is a molded resin product obtained by integrally molding the entire frame body 143 including the flexible portion 143a. Therefore, manufacturing cost of the CD/DVD drive unit 14 is reduced.

[Structure of Heat Radiating Unit]

Figure 22:
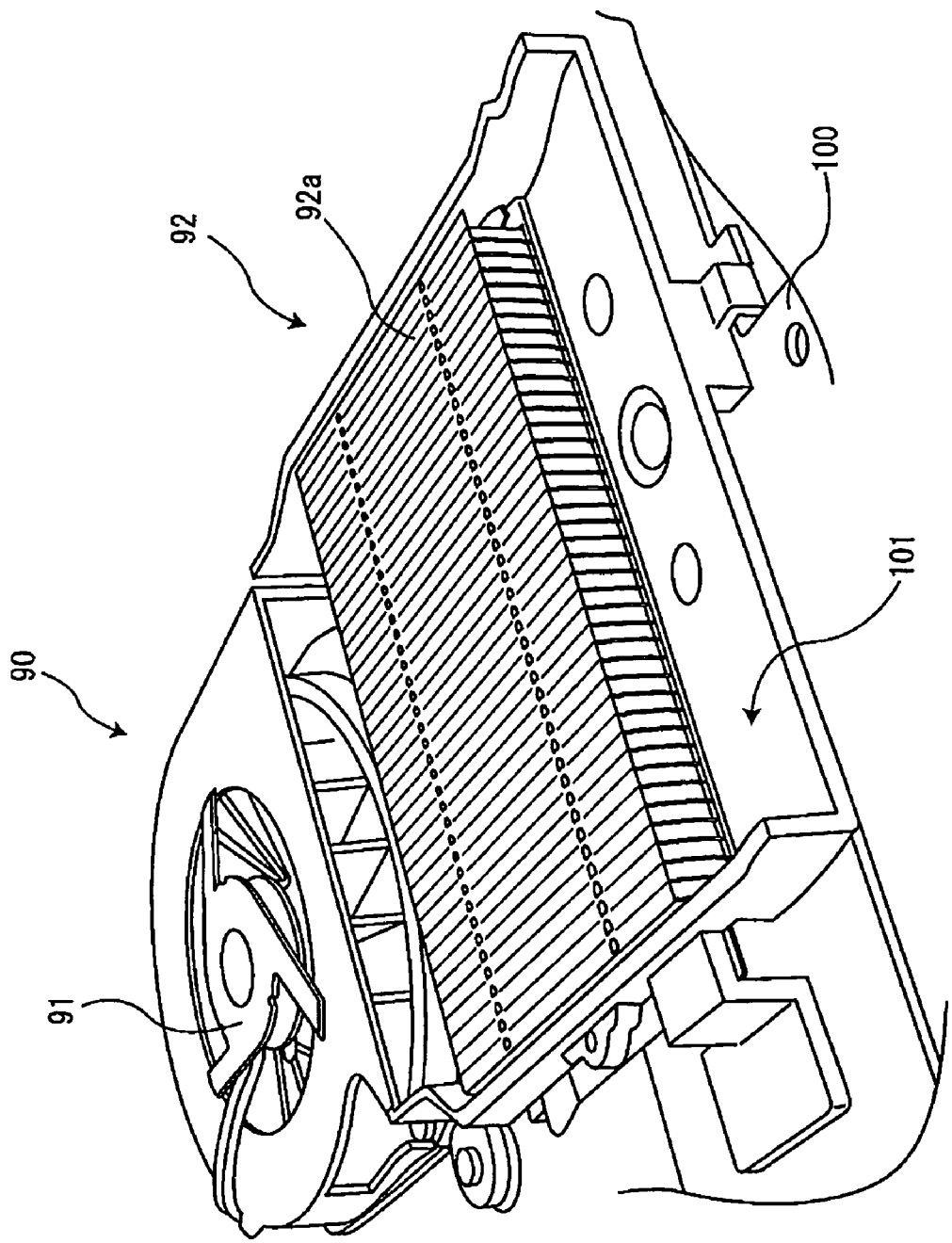
FIG. 22 is a perspective view of a heat radiating unit provided in the main unit.
Figure 23:
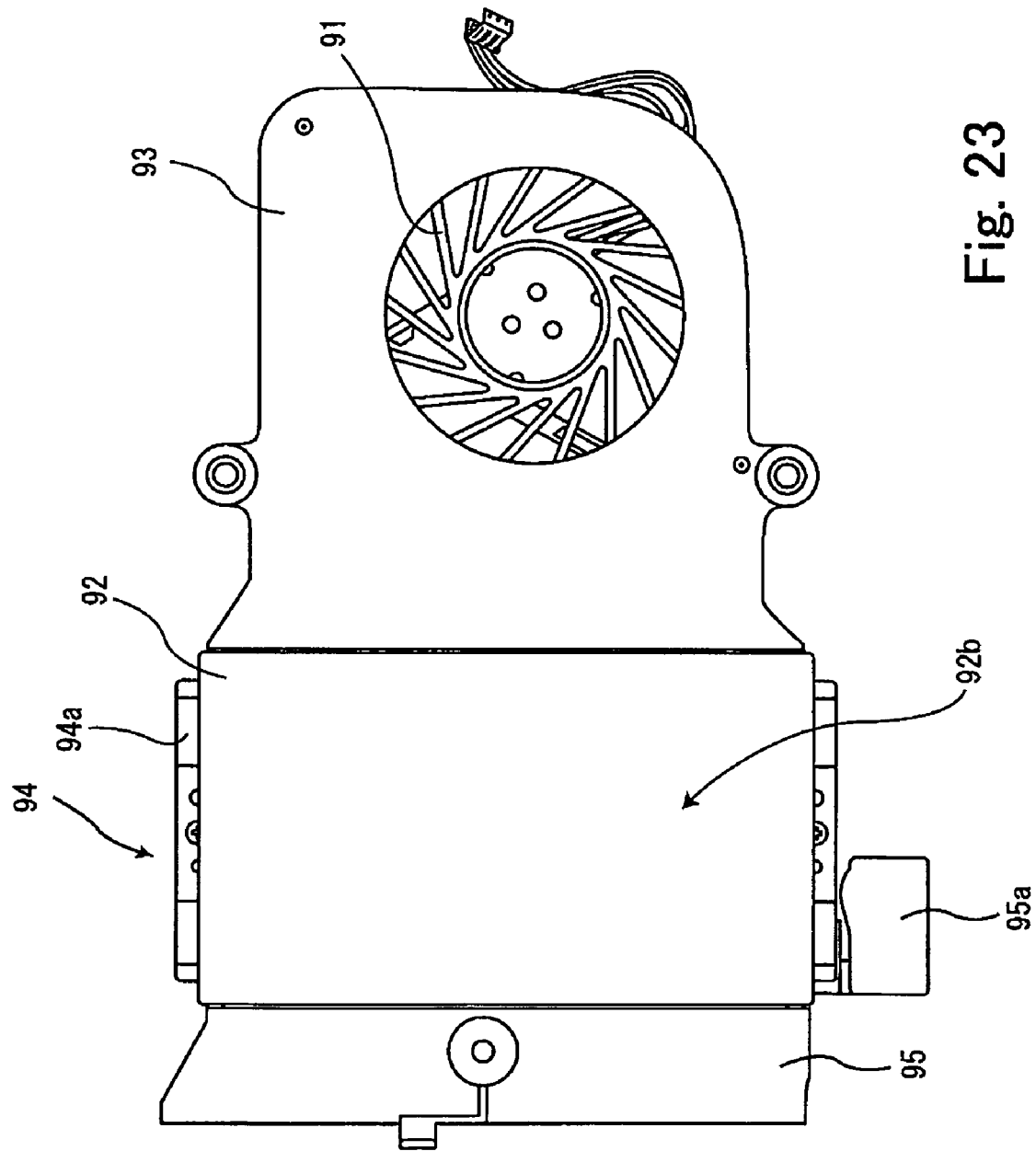
FIG. 23 is a diagram of the heat radiating unit illustrated in FIG. 22 as viewed from below.
Figure 24:
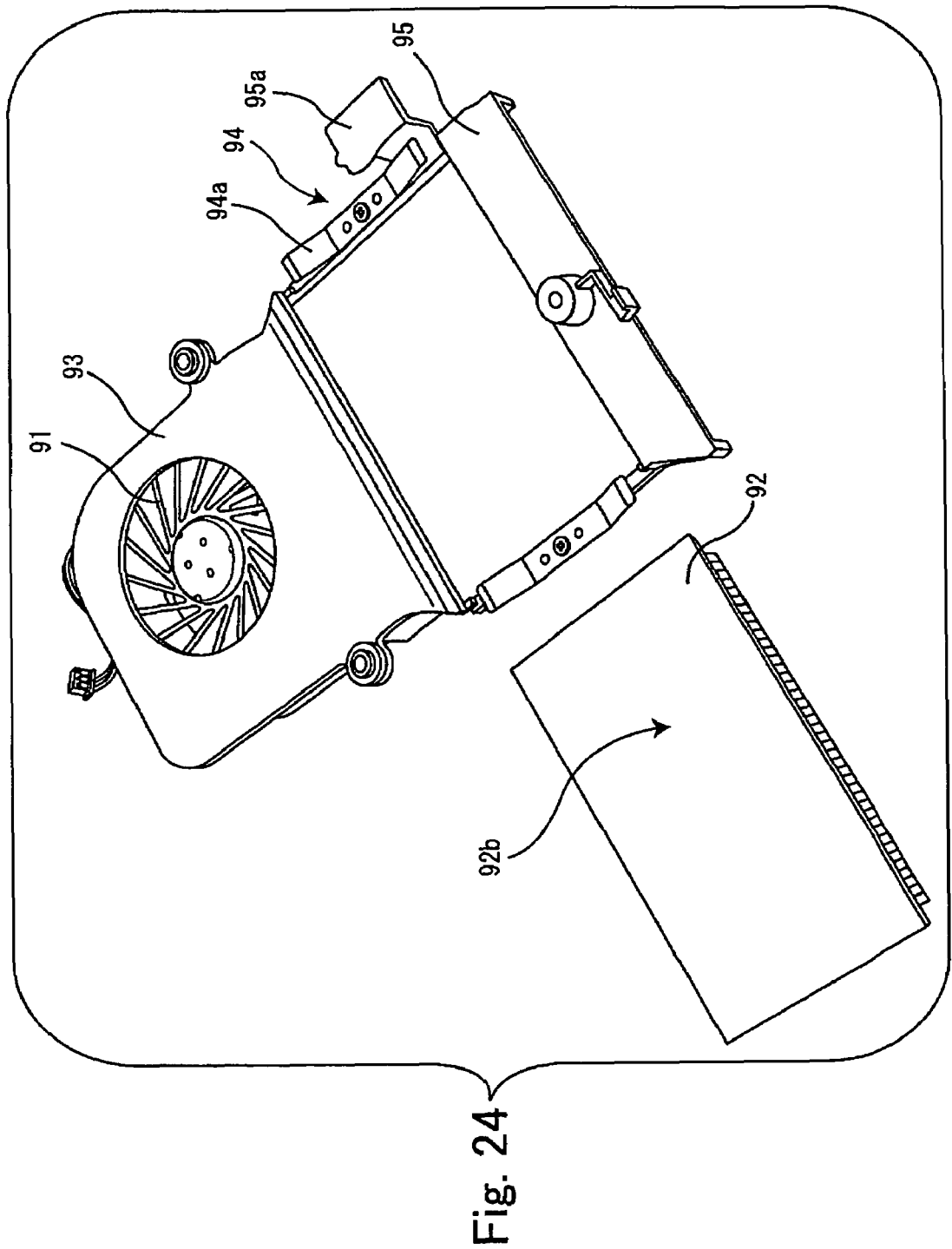
FIG. 24 is an exploded perspective view of the heat radiating unit illustrated in FIG. 23.

FIG. 22 is a perspective view of a heat radiating unit 90 provided in the main unit. FIG. 23 is a diagram of the heat radiating unit 90 illustrated in FIG. 22 as viewed from back. FIG. 24 is an exploded perspective view of the heat radiating unit 90 illustrated in FIG. 23.

The heat radiating unit 90 illustrated in FIG. 22 is disposed on a circuit substrate 100 of the main unit 10. A heat-producing component such as a CPU is mounted on the circuit substrate 100. The heat radiating unit 90 is provided with a fan 91 for blowing air and a heat radiating member 92 made of metal with heat radiating fins 92a arranged to transfer heat to the passing air.

In addition, as illustrated in FIG. 23 and FIG. 24, the heat radiating unit 90 has a fan fixing section 93 where the fan 91 is fixed and a metal-made supporting member 95 having a heat-radiating-member biasing section 94 disposed between the fan fixing section 93 and an air outlet 101 (see FIG. 22). The heat-radiating-member biasing section 94 has an opening facing downward, i.e. facing the direction opposite to the circuit substrate 100 and biases the heat radiating member 92 toward the circuit substrate 100. The metal-made supporting member 95 forms an airflow path in cooperation with the main unit 10.

Here, the heat radiating member 92 has, on its undersurface, an endothermic section 92b for contacting the top surface of a first heat-producing component disposed on the circuit substrate 100 so as to absorb heat from the first heat-producing component.

In addition, the supporting member 95 has an endothermic arm 95a that extends toward and contacts the top surface of a second heat-producing component on the circuit substrate 100 so as to absorb heat from the second heat-producing component. The second heat-producing component and the first heat-producing component have the top surfaces of different heights.

In the heat radiating unit 90, heat generated by the first heat-producing component is absorbed by the endothermic section 92b of the heat radiating member 92, and heat generated by the second heat-producing component whose top surface has a height different from that of the first heat-producing component is absorbed by the endothermic arm 95a of the supporting member 95. Accordingly, heat generated by both the first and the second heat-producing components having the top surfaces of different heights can be absorbed with a simple structure.

In addition, the heat-radiating-member biasing section 94 is provided with a plate spring 94a having a deforming stroke for providing a force toward the top surface of the first heat-producing component. Therefore, the heat radiating member 92 is securely pressed against and abuts the top surface of the first exothermic member.

When assembling the notebook PC illustrated in FIG. 1, there is a case where a component that matches the model and function of the notebook PC is selected as the first heat-producing component from among two or more types of heat-producing components (CPU, for example) having different heights, and the selected first heat-producing component is mounted on the circuit substrate 100. Even in such a case, the heat radiating member 92 can be securely pressed against and abut the top surface of the selected first heat-producing component by the plate spring 94a.

In addition, as described above, the heat radiating member 92 and the supporting member 95 are both made of metal and thus can absorb the heat generated by the first and second heat-producing components having the top surfaces of different heights.

What is claimed is:

1. An electronic component mounting part, comprising:
a pair of component fixing sections that respectively extend along both sides of an electronic component having a front end and a rear end in addition to the sides and are fixed to the electronic component, the component fixing sections having widths not more than height of the electronic component;
a first apparatus fixing section that extends from the component fixing sections up to a position apart from the front end of the electronic component and is fixed to an electronic apparatus at the position apart from the front end; and
a second apparatus fixing section that extends from the component fixing sections up to a position apart from the rear end of the electronic component and is fixed to the electronic apparatus at the position apart from the rear end, wherein each of the component fixing sections includes a first portion extending along and apart from one of the sides of the electronic component and a second portion sagging from the first portion toward the side to be in contact with the side and fastened to the electronic component.

2. The electronic component mounting part according to claim 1, wherein the component fixing section includes:
a side-along portion that extends along the side of the electronic component from the front end to the rear end of the electronic component;
a front-end side bending portion that extends from the side-along portion and bends toward the front end of the electronic component to cover a part of the front end; and
a rear-end side bending portion that extends from the side-along portion and bends toward the rear end of the electronic component to cover a part of the rear end, the side-along portion being formed of the first portion and the second portion.

3. The electronic component mounting part according to claim 1, wherein the electronic component mounting part is a metal sheet.

4. The electronic component mounting part according to claim 1, wherein one of the first apparatus fixing section and the second apparatus fixing section is formed by a single portion extending from both of the pair of component fixing sections, the other is formed by two portions extending from the respective component fixing sections, and the electronic component mounting part is formed integrally by molding.

5. The electronic component mounting part according to claim 1, wherein the electronic component mounting part is used to mount an electronic component including a mechanical driving section onto an electronic apparatus.

6. The electronic component mounting part according to claim 5, wherein the electronic component mounting part is used to mount an electronic component, which accesses a storage medium with a mechanical driving section, onto an electronic apparatus.

7. The electronic component mounting part according to claim 1, wherein the electronic component mounting part is used to mount an electronic component, which generates vibration, onto an electronic apparatus.

8. The electronic component mounting part according to claim 1, wherein the electronic component mounting part is used to mount an electronic component in the shape of a substantially rectangular solid when viewed from above onto an electronic apparatus.

9. An electronic apparatus, comprising:
an electronic component mounting part having:
a pair of component fixing sections that respectively extend along both sides of an electronic component having a front end and a rear end in addition to the sides and are fixed to the electronic component, the component fixing sections having widths not more than height of the electronic component;
a first apparatus fixing section that extends from the component fixing sections up to a position apart from the front end of the electronic component and is fixed to an electronic apparatus at the position apart from the front end; and
a second apparatus fixing section that extends from the component fixing sections up to a position apart from the rear end of the electronic component and is fixed to the electronic apparatus at the position apart from the rear end,
wherein each of the component fixing sections includes a first portion extending along and apart from one of the sides of the electronic component and a second portion sagging from the first portion toward the side to be in contact with the side and fastened to the electronic component; and
an electronic component mounted by the electronic component mounting part.

10. The electronic apparatus according to claim 9, further comprising a data-processing unit provided with a built-in data-processing circuit that carries out data processing and a keyboard disposed on a top surface to input an instruction according to an operation.

11. The electronic apparatus according to claim 10, further comprising, in addition to the data-processing unit, a display unit that includes a display screen for displaying information and is linked to the data-processing unit in an openable and closable manner.

* * * * *